INVENTOR.
VLADIMIR H. PAVLECKA
BY
Nicholas T. Vohr
ATTORNEY.

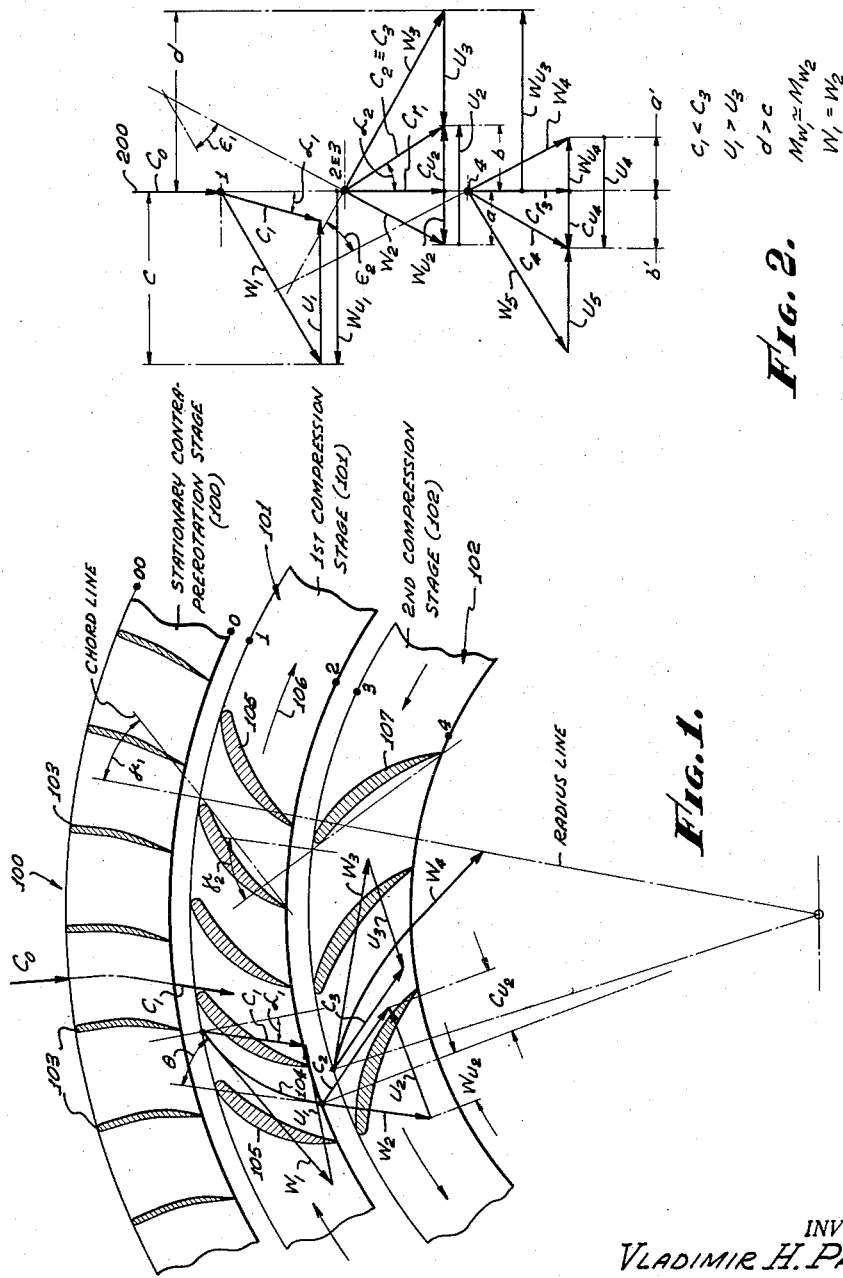

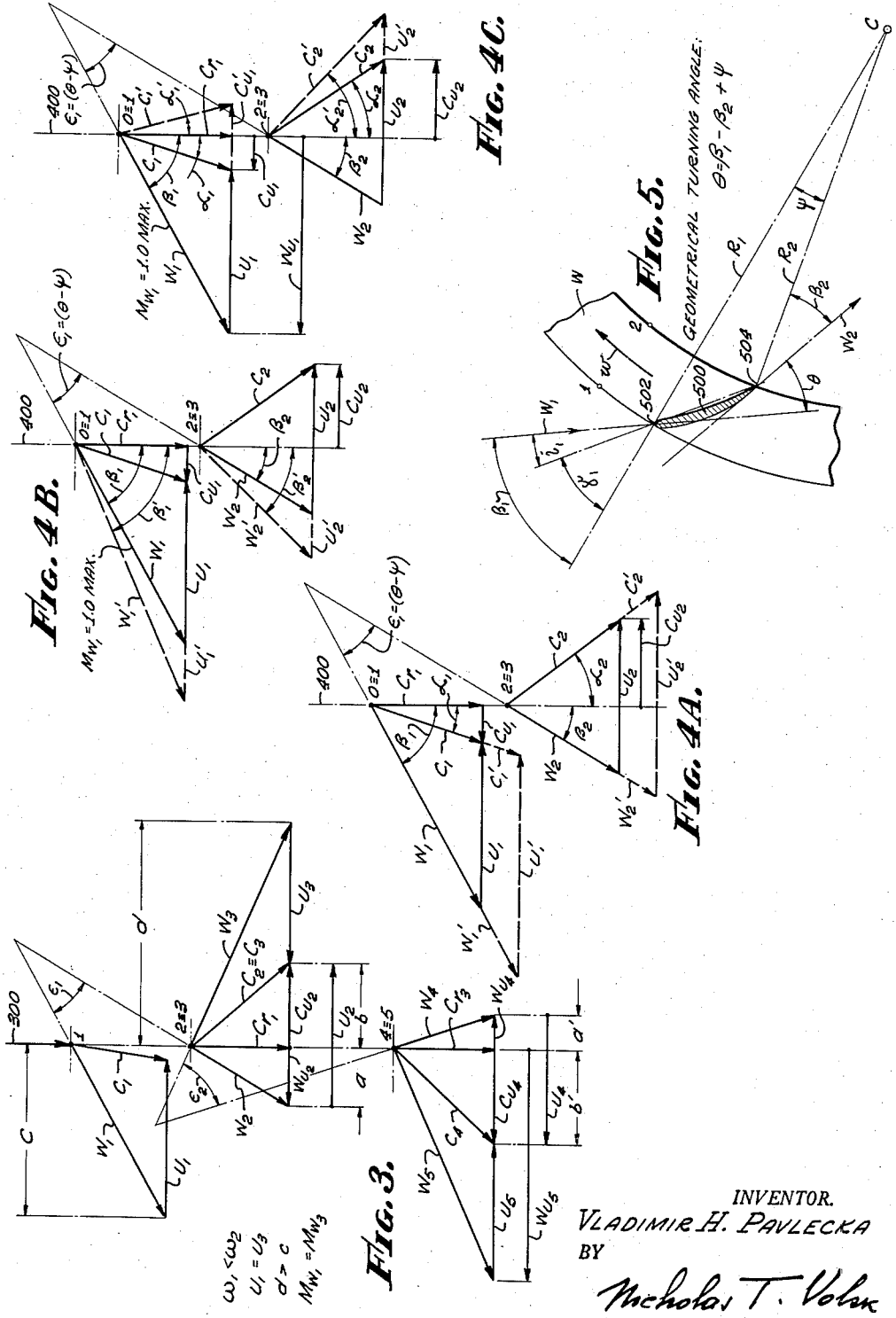

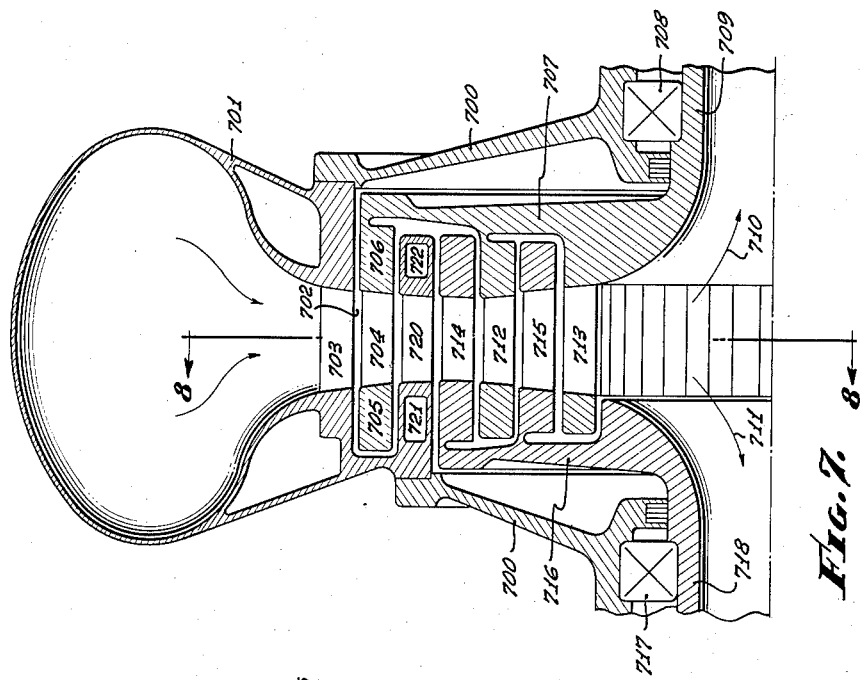
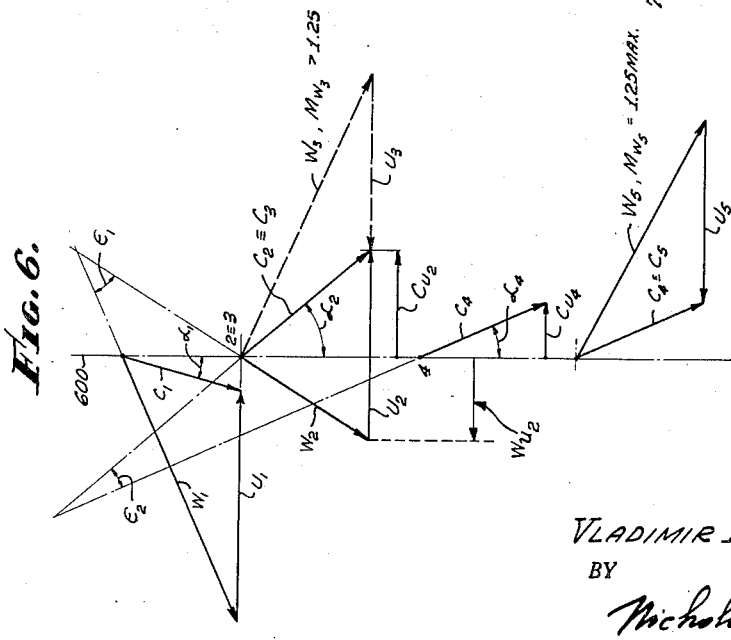

June 26, 1962 V. H. PAVLECKA 3,040,971
METHODS OF COMPRESSING FLUIDS WITH CENTRIPETAL COMPRESSORS
Original Filed June 8, 1955 14 Sheets-Sheet 5
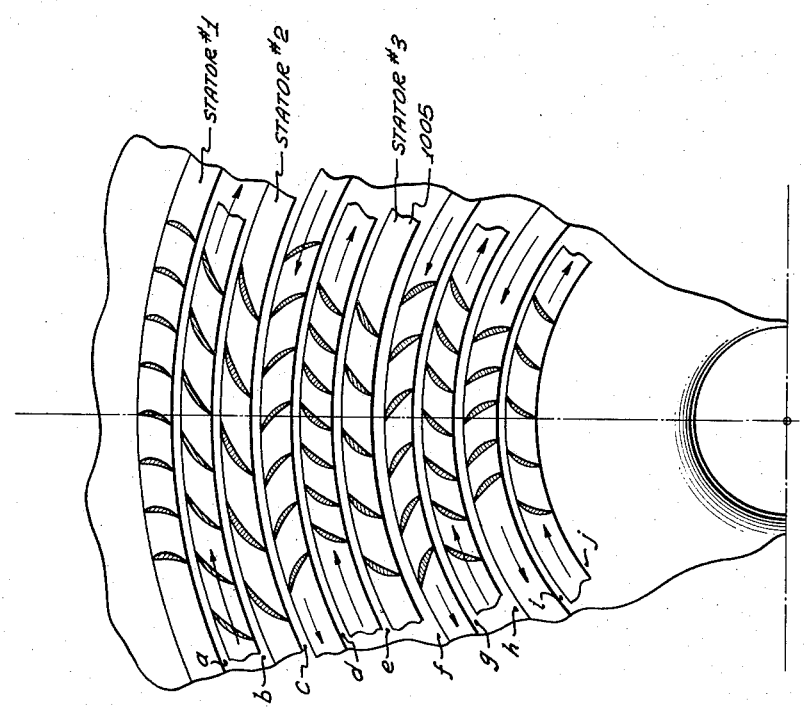
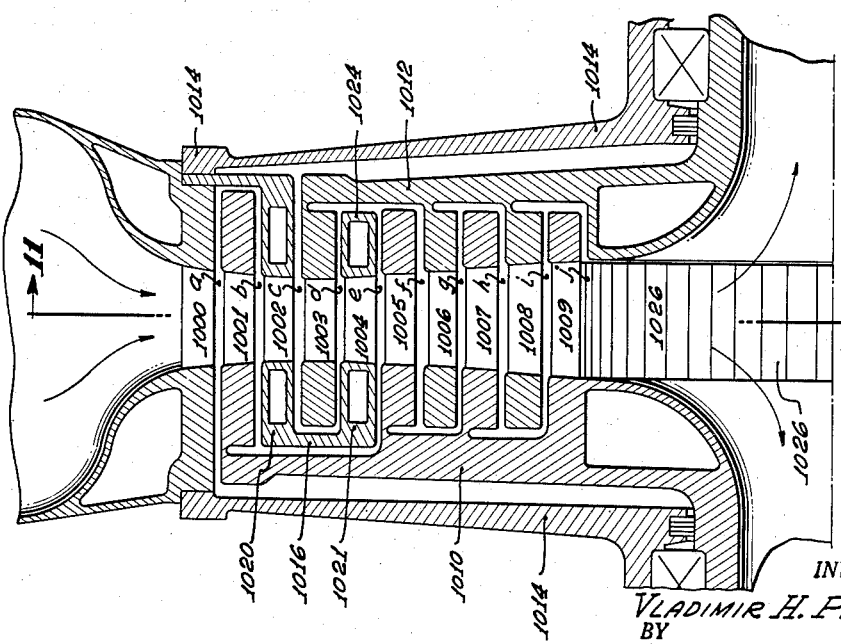
INVENTOR.
VLADIMIR H. PAVLECKA
BY
Nicholas T. Volk
ATTORNEY.

INVENTOR.
VLADIMIR H. PAVLECKA
BY
Nicholas T. Volk
ATTORNEY.

INVENTOR.
VLADIMIR H. PAVLECKA
BY
Nicholas T. Voluk
ATTORNEY.

June 26, 1962 V. H. PAVLECKA 3,040,971
METHODS OF COMPRESSING FLUIDS WITH CENTRIPETAL COMPRESSORS
Original Filed June 8, 1955 14 Sheets-Sheet 8
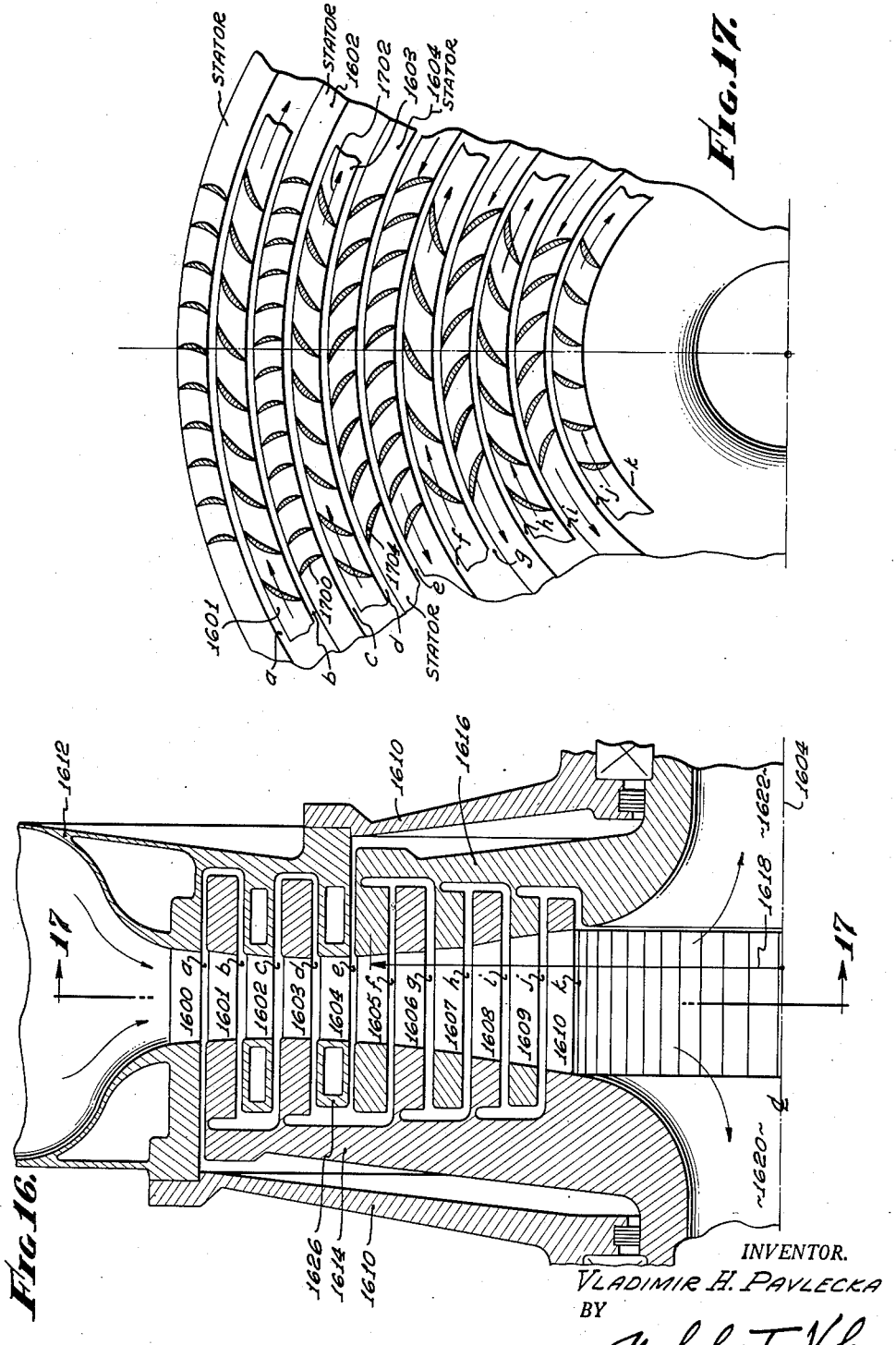
INVENTOR.
VLADIMIR H. PAVLECKA
BY
Nicholas T. Volk
ATTORNEY.

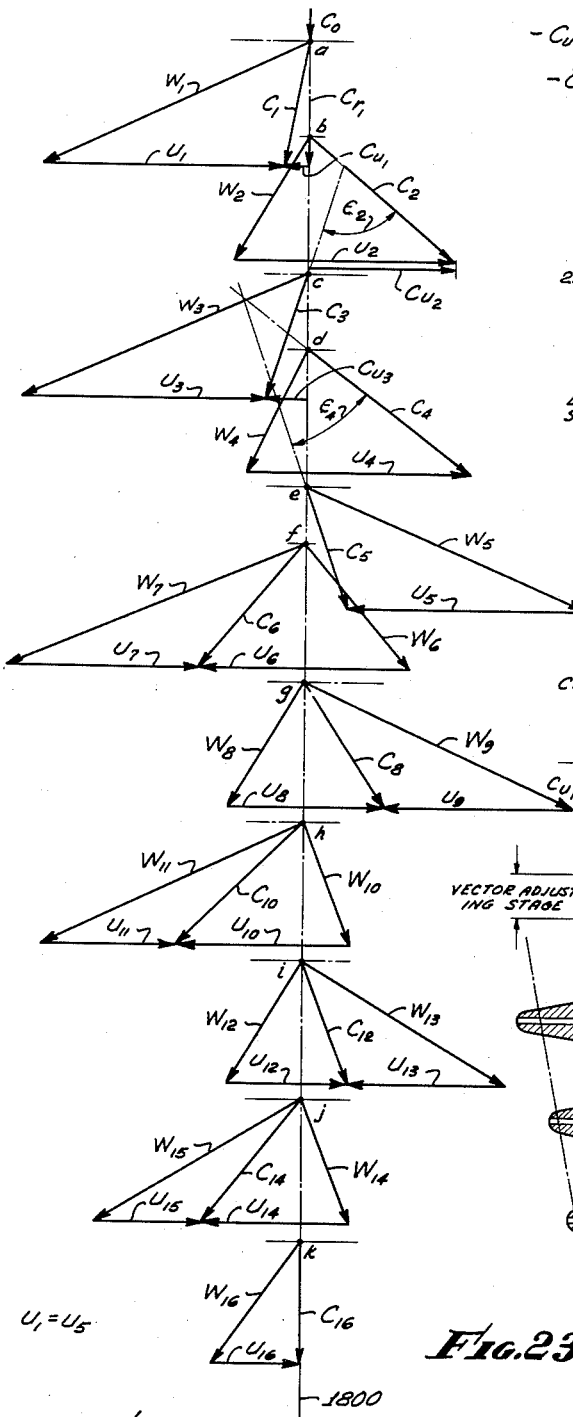
FIG. 18.
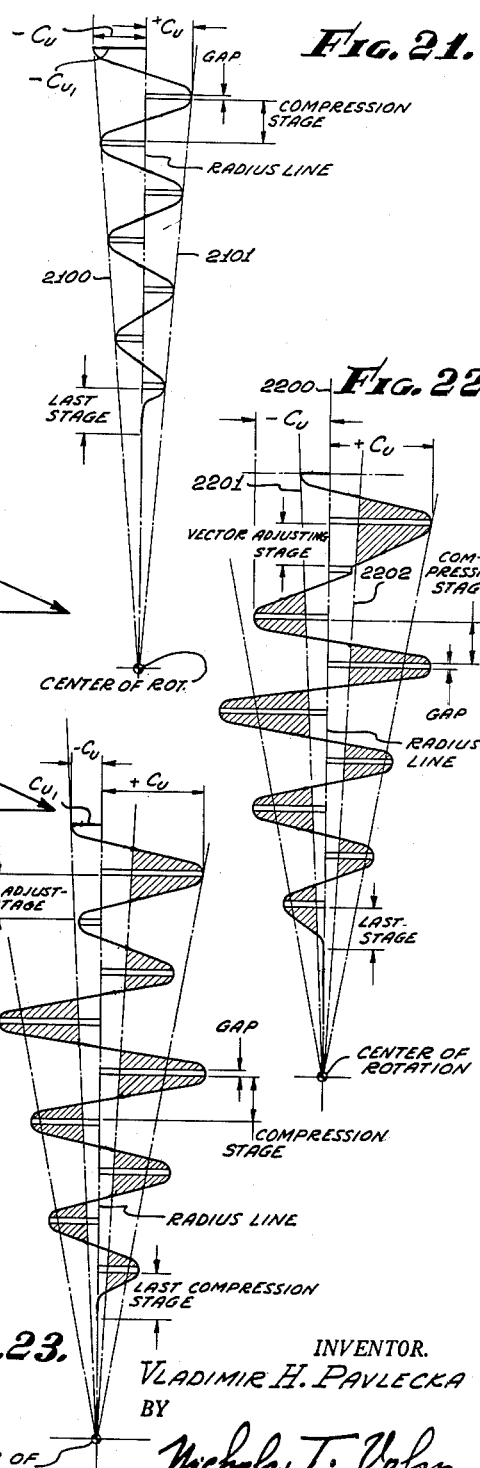
FIG. 21.
FIG. 22.
FIG. 23.
INVENTOR.
VLADIMIR H. PAVLECKA
BY Nicholas T. Volk
ATTORNEY.

June 26, 1962 V. H. PAVLECKA 3,040,971
METHODS OF COMPRESSING FLUIDS WITH CENTRIPETAL COMPRESSORS
Original Filed June 8, 1955 14 Sheets-Sheet 10
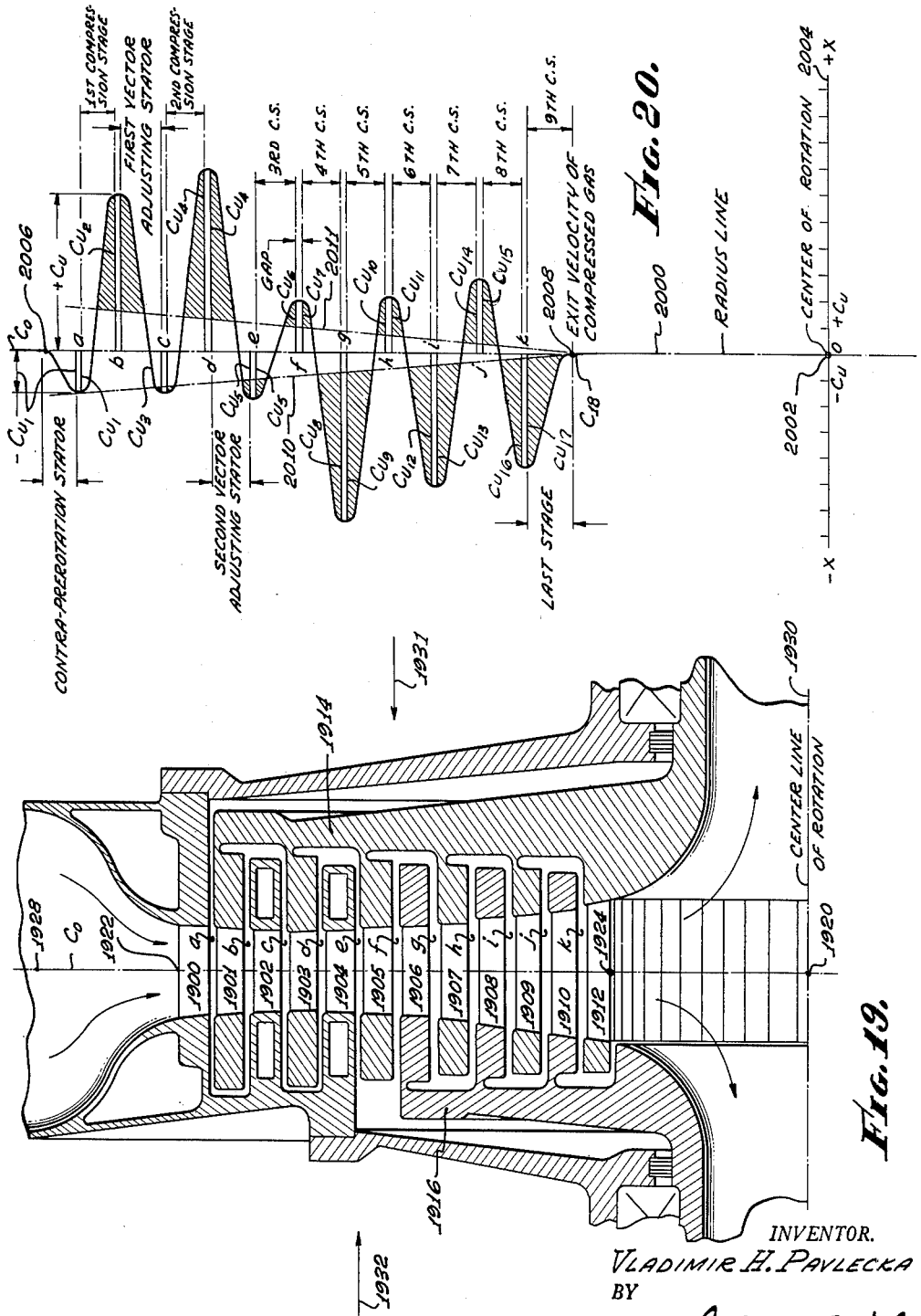
INVENTOR.
VLADIMIR H. PAVLECKA
BY
Nicholas T. Volak
ATTORNEY.

June 26, 1962 V. H. PAVLECKA 3,040,971
METHODS OF COMPRESSING FLUIDS WITH CENTRIPETAL COMPRESSORS
Original Filed June 8, 1955 14 Sheets-Sheet 11
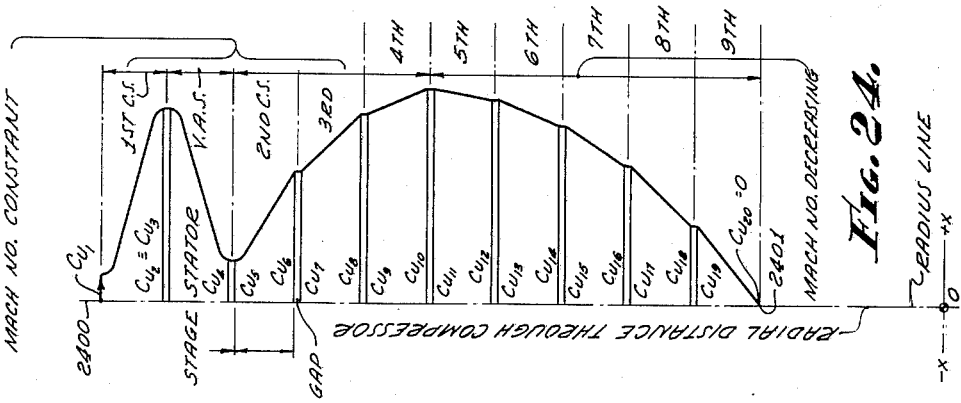
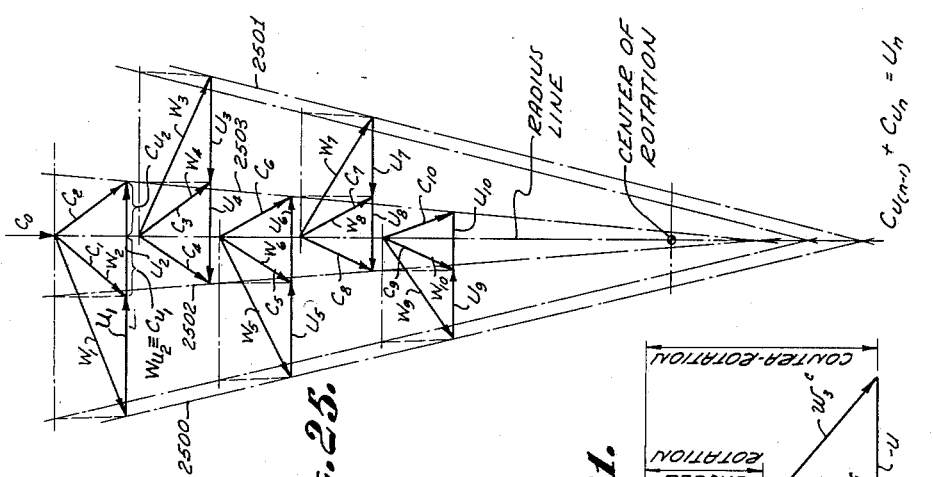
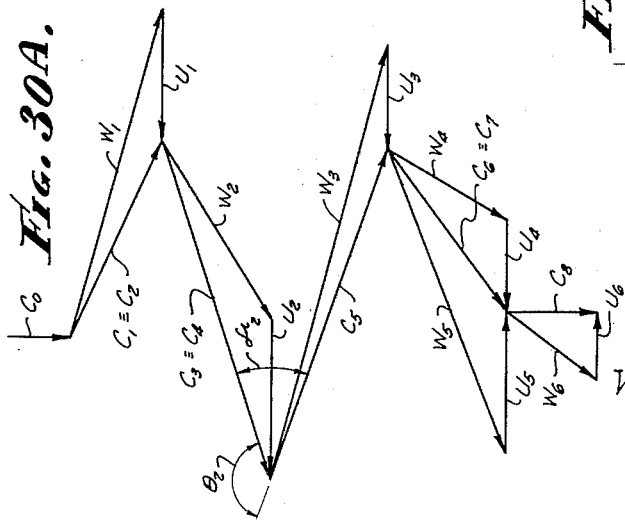
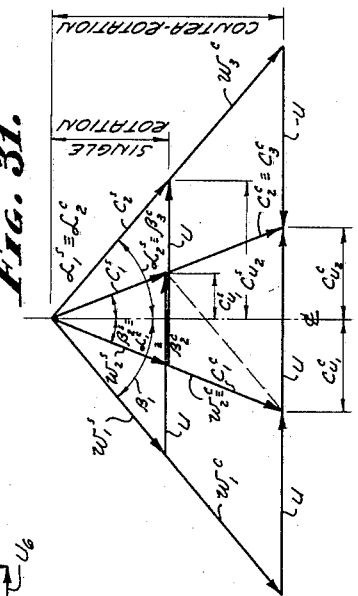
INVENTOR.
VLADIMIR H. PAVLECKA
BY HIS
ATTORNEY.

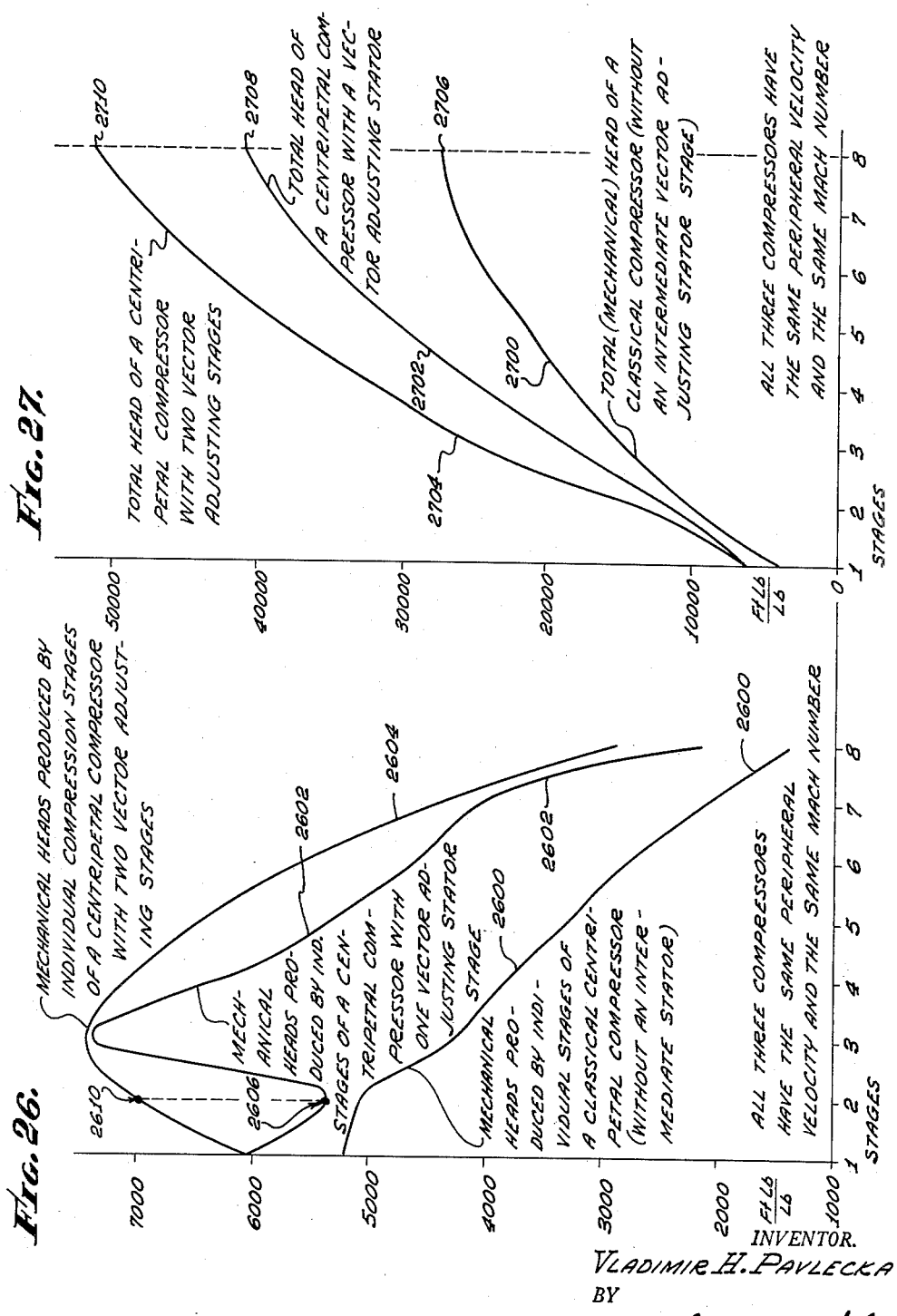

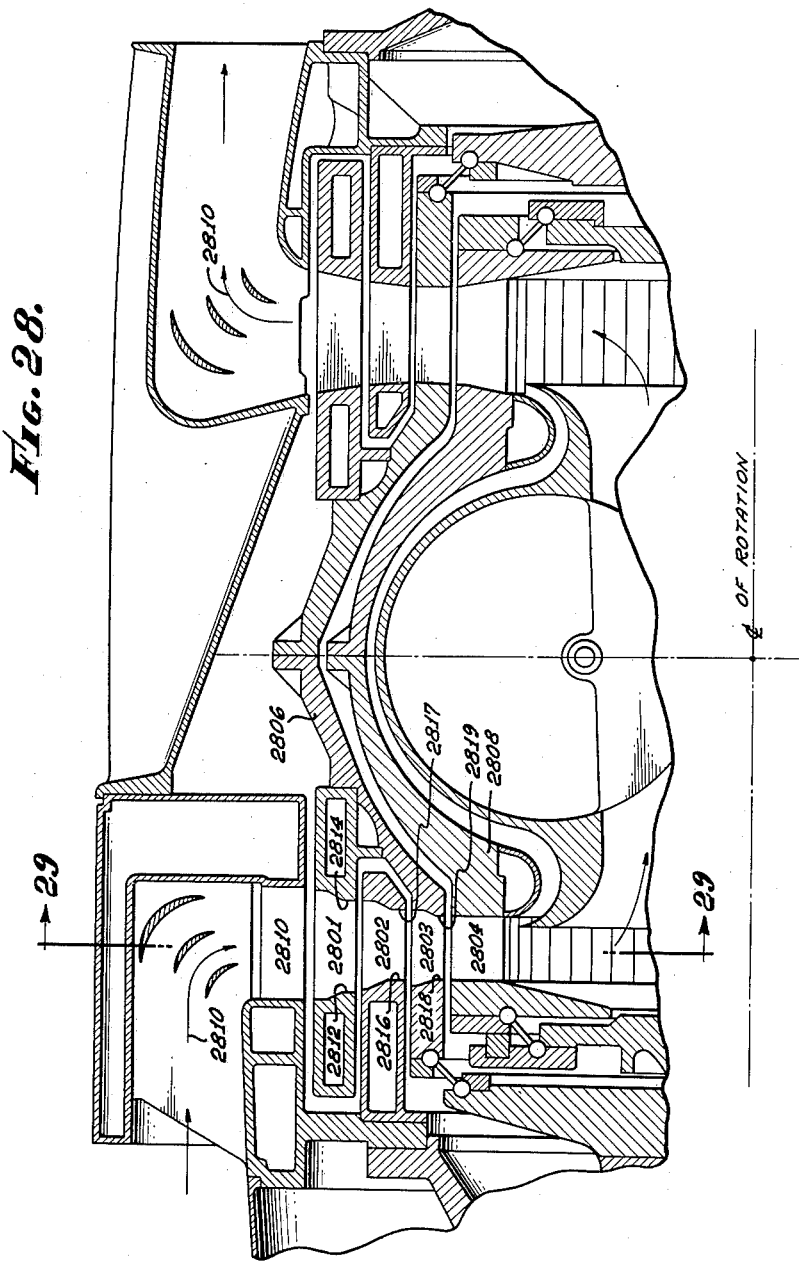

June 26, 1962 V. H. PAVLECKA 3,040,971
METHODS OF COMPRESSING FLUIDS WITH CENTRIPETAL COMPRESSORS
Original Filed June 8, 1955 14 Sheets-Sheet 14
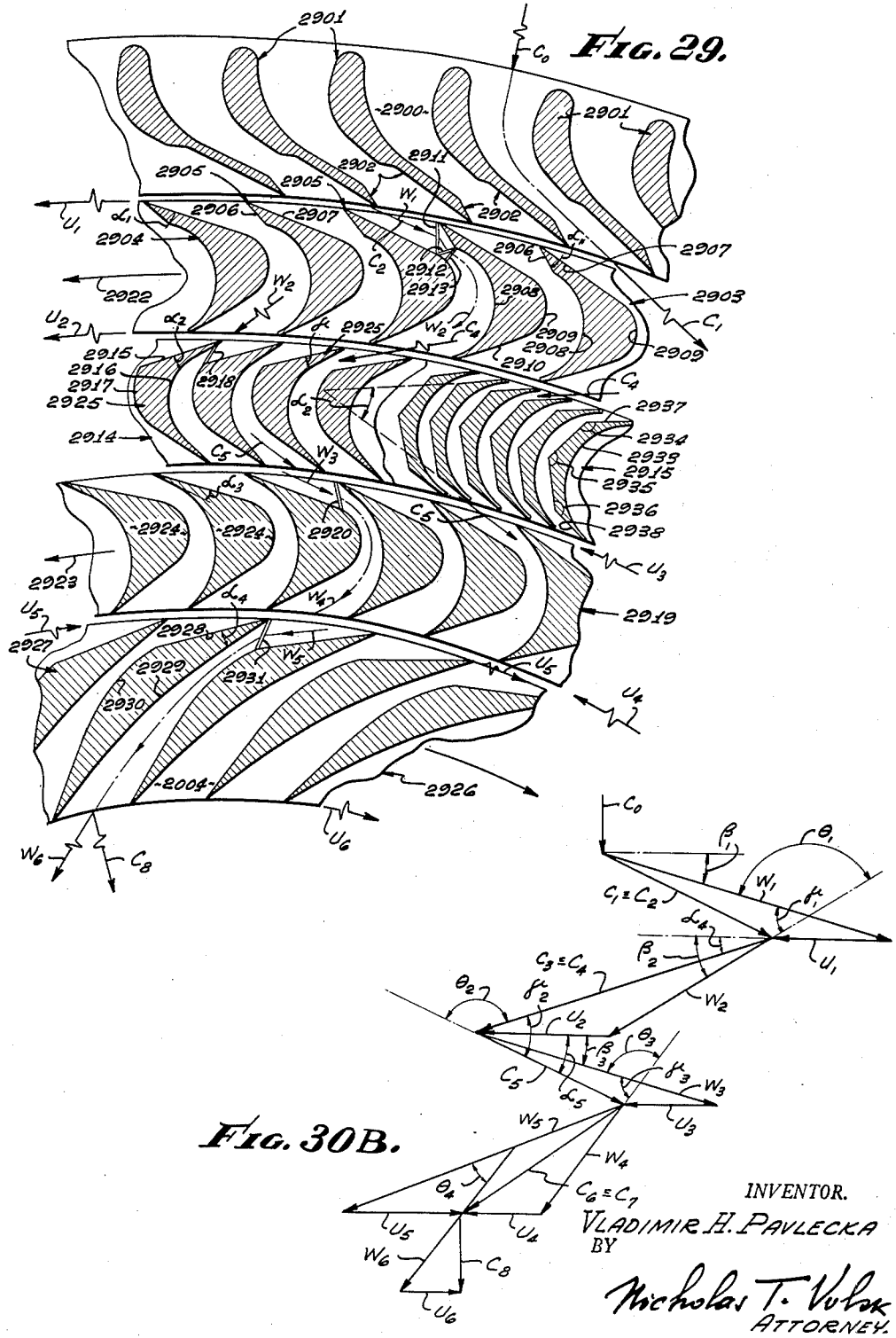
INVENTOR.
VLADIMIR H. PAVLECKA
BY
Nicholas T. Volak
ATTORNEY.

United States Patent Office 3,040,971
Patented June 26, 1962

3,040,971
METHODS OF COMPRESSING FLUIDS WITH CENTRIPETAL COMPRESSORS
Vladimir H. Pavlecka, Pacific Palisades, Calif., assignor to American Machine & Foundry Company, a corporation of New Jersey
Continuation of application Ser. No. 514,001, June 8, 1955. This application Mar. 2, 1960, Ser. No. 12,479
18 Claims. (Cl. 230—124)

This application for patent is a continuation of my earlier application, Serial Number 514,001, filed June 8, 1955, entitled Methods of Compressing Fluids With Centripetal Compressors, now abandoned, which is being replaced with this application.

This invention relates to novel methods of compressing elastic fluids by means of centripetal flow dynamic compressors.

It is an object of this invention to provide novel compression methods for centripetal flow compressors, in which loading of the stages is apportioned so as to operate as many stages as possible at constant local Mach numbers for obtaining maximum total head from a given number of compression stages.

Still another object of this invention is to provide novel compression methods for subsonic flow compressors in which energy contributions of the respective stages are increased by introducing one or several stationary vector-adjusting stages between the outermost compression stages for obtaining a more effective and uniform distribution of the fluid dynamic energies among all compression stages.

The novel features which are believed to be characteristic of the invention, both as to its organization and method of operation, together with further objects and advantages thereof, will be better understood from the following description taken in connection with the accompanying drawings in which several embodiments of the invention are illustrated as examples of the invention. Referring to the drawings:

FIG. 1 is a transverse sectional view of a centripetal compressor with asymmetric arrangement of compression stages;

FIG. 2 is a vector diagram for the compressor illustrated in FIG. 1;

FIGS. 3 and 4A through 4C are explanatory vector diagrams;

FIG. 5 is a diagram illustrating the chordal angle $\epsilon$.

FIGS. 6 and 9 are vector diagrams for the centripetal subsonic compressor illustrated in FIG. 7 which has a single vector-adjusting stage between the first and the second compression stage;

FIGS. 7 and 8 are axial and transverse sections, respectively, of a centripetal compressor with a single vector-adusting stage and two contra-rotating rotors with the vector-adjusting stage being positioned between the first and second contra-rotatable compression stages;

FIGS. 10 and 11 are axial and transverse sections, respectively, of a centripetal subsonic compressor having two vector-adjusting stages, each vector stage being positioned between contra-rotating stages;

FIGS. 16, 17 and 18 are the sectional views and the vector diagram, respectively, for a centripetal flow compressor with two vector-adjusting stages, the first vector-adjusting stage being positioned between two co-rotating compression stages and the second vector-adjusting stage being positioned between two contra-rotating compression stages.

FIG. 19 is an axial sectional view of a centripetal flow compressor with two vector-adjusting stages, both of the vector-adjusting stages being positioned between the co-rotating stages.

FIG. 20 is a diagram of peripheral velocities of fluids through a centripetal flow subsonic compressor shown in FIG. 19 by the resultant curve indicating the changes in these velocities as the fluid travels from an outer periphery of the compressor toward its axis of rotation.

FIG. 21 is the same curve as that illustrated in FIG. 20, but for a classical centripetal compressor having two contra-rotating rotors and a symmetrical vector diagram such as that illustrated in FIG. 25.

FIG. 22 is the same curve for a compressor having one vector-adjusting stage positioned between contra-rotating stages, i.e., it is the peripheral velocities curve for a compressor similar to the compressor illustrated in FIGS. 7, 8 and 9, but having nine compression stages instead of 5.

FIG. 23 is the peripheral velocities curve for a compressor similar to the compressor illustrated in FIGS. 13, 14, and 15 but having nine compression stages instead of five.

FIG. 24 is a graph of the absolute values of the peripheral velocity vectors $(C_u)$'s for a compressor having a single vector-adjusting stage.

FIG. 25 is a vector diagram for a classical centripetal compressor having two contra-rotating rotors and a stationary contraprerotation input stage, with the energy contributions of the stages progressively decreasing as one progresses from the first stage toward the innermost stage.

FIGS. 26 and 27 are total head (pressure and kinetic energy) curves for the classical compressor and for two compressors having vector-adjusting stages.

FIG. 28 is a longitudinal sectional view of a complete gas turbine power plant disclosing a supersonic compressor with one vector-adjusting stage positioned between two co-rotating supersonic compression stages followed by one contra-rotating supersonic compression stage.

FIG. 29 is a transverse sectional view of the supersonic compressor illustrated in FIG. 28, said transverse section being taken along line 29—29 shown in FIG. 28.

FIGS. 30A and 30B are vector diagrams for the supersonic compressor illustrated in FIGS. 28 and 29.

FIG. 31 is a vector diagram for a single rotation compressor and a contra-rotating compressor used for comparing the performances of the two types of compressors.

*Consideration of Basic Problems Relating to Centripetal Compression of Gases*

My U.S. Patent #2,712,895, entitled "Centripetal Subsonic Compressor," discloses a subsonic centripetal compressor having a stationary contra-prerotation stage and two contra-rotating rotors rotatable at two equal but opposite angular velocities. The successive compression stages of one rotor interleave the corresponding successive stages of the second rotor, and since the angular velocities of the two rotors are equal, the pressure heads of the successive stages decrease as a function of the square of the radius of the respective stages. Accordingly, the outer compressor stage does the major part of energy conversion, and the last stage, or the inner stage, does the least amount of energy conversion. Such distribution of the energy conversion characteristics results in an over-all compression ratio which is limited by the maximum Mach number which is permissible on the first stage. Accordingly, compression heads, $$\frac{\text{ft. lbs.}}{\text{lb.}}$$

in the order of 60,000 foot-pounds/pound are obtainable with such compressors with the Mach number in the order of 0.9 in the first stage.

Figures 12, 15:
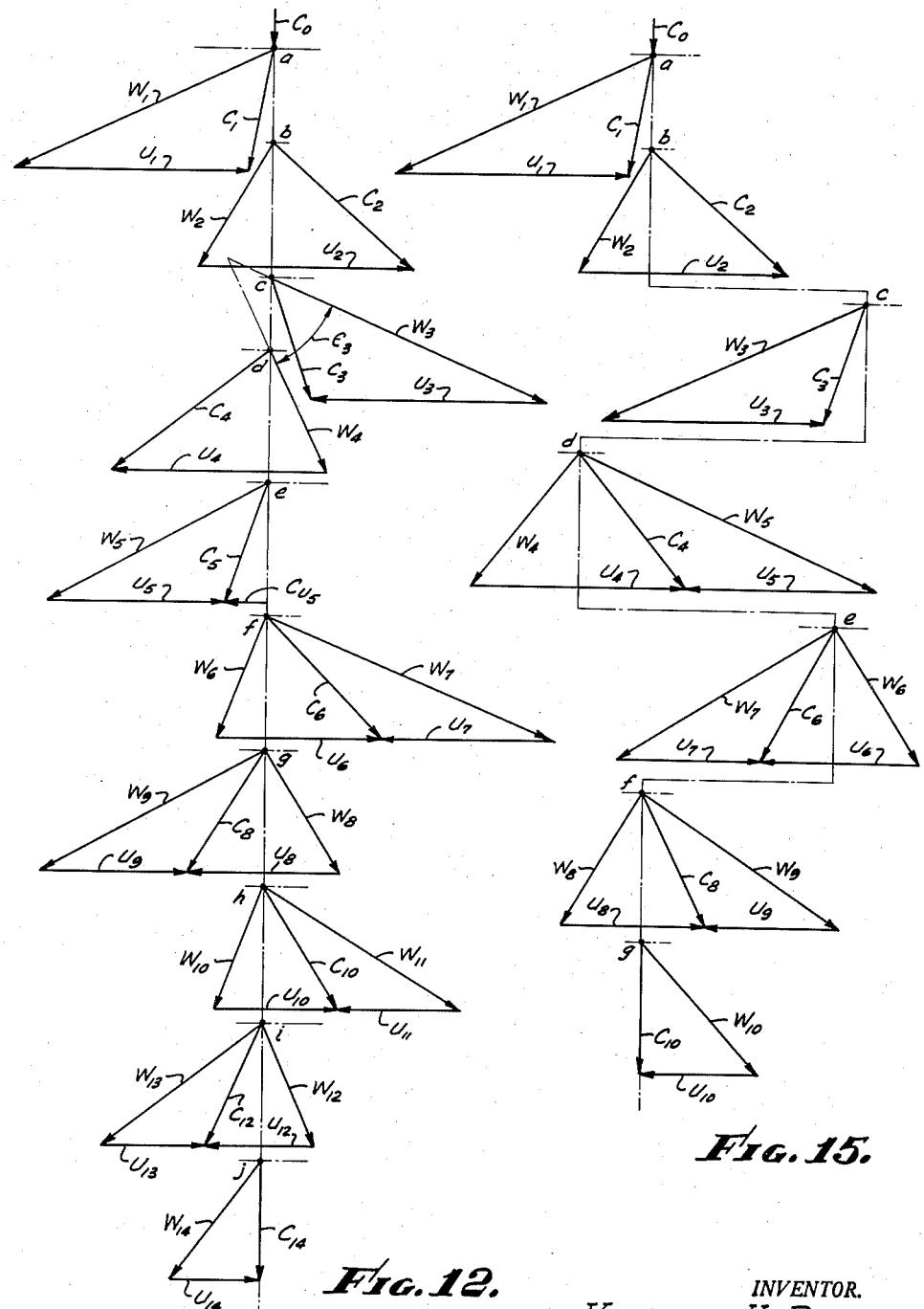
FIG. 12 is a vector diagram of the compressor of FIGS. 10 and 11.
FIGS. 13 and 14 are axial and transverse sectional views of a centripetal flow compressor having a single vector-adjusting stage positioned between two co-rotating compression stages and FIG. 15 is a vector diagram for this compressor.

The centripetal flow, multi-stage contra-rotatable two rotor compressor disclosed in the U.S. Patent #2,712,895, has its velocity diagram illustrated in FIG. 12 in the above patent. For a better understanding of this invention, the same velocity vector diagram of FIG. 12 is also reproduced here in FIG. 25. If the fluid to be compressed is air, the ambient air enters the stationary prerotation stage of the compressor with an absolute velocity $C_0$ (see FIG. 25) and leaves it with a velocity $C_1$, which is the maximum absolute velocity of fluid in the above compressor. The maximum peripheral velocity in the entire compressor is $U_1$, which is the peripheral velocity of the outer rim of the first compression stage, and the maximum relative velocity is $W_1$ at the entry into the first stage. From then on, all vectors progressively become smaller and the compressed air finally leaves the last stage with the lowest absolute velocity $C_{24}$ of the entire velocity vector system. It would be theoretically possible to convert the vector diagrams of FIG. 25 into a series of vector triangles equal to each other, in which case line 2500 and 2501 would be parallel to each other and also parallel to line 2504, which is the radius reference line for the vector diagram. Such conversion could be accomplished by making the peripheral velocities of all stages equal to the peripheral velocity $U_1$. To obtain this, the inner stages would have to rotate at the progressively higher angular velocities, the angular velocities increasing from the outer stage toward the inner stage as a function of the mean radius of any given stage. If it were possible to achieve the above in actual practice with the aid of a practicable and inexpensive design, then all stages in a centripetal compressor would have equal energy conversions. The only "practicable" way of obtaining such peripheral velocity distribution would be by connecting the respective stages of the compressor to the respective stages of a "free" turbine, i.e., a turbine in which each stage is free to rotate at its own speed determined by the forces acting on this stage. Structures of this type are disclosed in the Griffith U.S. Patent No. 2,391,779, in which the power plant comprises a plurality of concentric, disconnected, contra-rotatable rings, each ring including one centripetal flow compression stage and one centrifugal flow turbine stage. Such attempts of obtaining equal energy conversions throughout the compressor are not practicably attainable due to the mechanical and fluid dynamic complexities.

Reverting once more to FIG. 25, it is immediately apparent that the velocity vector diagram disclosed in FIG. 25 has only one critically high velocity, which is the relative velocity $W_1$, at the entry into the first stage of the compressor. The local Mach number $M_{w_1}$ at this point is equal to $$M_{w_1} = \frac{W_1}{a_1} \quad (1)$$

where $a_1$ is the local speed of sound. This local Mach number determines the performance of the entire compressor of the above type and, what is most important, it also determines the energy conversions of all the remaining stages of the compressor. The maximum value of $M_{w_1}$ may be in the order of .95 which is the maximum local Mach number that can be used in a subsonic compressor. (Theoretically the number is .999 . . . .) If the local Mach number exceeds this maximum value, the compressor enters a supersonic region which will complicate the operation of a subsonic compressor utilizing subsonic airfoils. In centripetal compressors having straight blading, supersonic mode of compression begins the moment the local Mach number is equal to 1.0. In the axial flow machines there is the so-called transonic region, which corresponds to the mode of operation at which the outer portion of the blade operates in the supersonic region, the root operates in the subsonic region, and there is a "transonic" region in the middle of the blade. Since in the centripetal flow compressor the blading is a straight blading, and the entire leading edge travels at the same velocity, the centripetal compressor blading operates either at subsonic or supersonic velocity, and there is no "transonic" mode of operation.

The inherent energy conversion distribution will remain basically the same as that illustrated in FIG. 25 and also in FIGS. 26 and 27 by curves 2600 and 2700. Curve 2600 illustrates the mechanical heads obtainable in each stage of the compressor, while curve 2700 illustrates the total head obtainable in the compressor. FIGS. 26 and 27 graphically illustrate what is also illustrated in FIG. 25, except that FIGS. 26 and 27 illustrate, so to speak, the "end product," i.e., the mechanical heads (pressure and kinetic energies produced by any given compression stage) per stage (FIG. 26) and the "total mechanical head" (FIG. 27) attained by the compressor, when the velocity distribution is of the type illustrated in FIG. 25. The curves illustrated in FIGS. 26 and 27, are for $M_{w_1} = .68$.

For $M_{w_1} = 0.9$, the values of the mechanical heads for all stages would be correspondingly higher. However, the curves of FIG. 26 would slope down just as rapidly as one would progress from the outer stages toward the innermost stage. The compressor disclosed in Patent #2,712,895 utilizing the velocity distribution illustrated in FIG. 25, will be called here, for simplifying all subsequent references, as a classical centripetal flow compressor. The meaning of the word "classical" here is that such compressor has two contra-rotatable rotors rotating at equal angular velocities, and the energy conversions of the stages decrease from the outermost stage toward the innermost stage as a function of the mean radius of any given stage, i.e., the compressor has the simplest geometry and vector diagram.

In the vector diagrams, as well as in the Eulerian relations in column 30 and following, it is important to define the vectorial directions of all peripheral vectors in tangential relation to the rotating and stationary stages. For his reason, vectorial signs are used only on tangential vectors and are omitted on all other vectors not tangent to the stages for simplifying the discussion.

In the classical compressor, from FIG. 25, one obtains the following relations, all velocities, except angular velocities, being vectors, counter-clockwise rotation being positive and clockwise rotation being negative:

$$\begin{aligned} M_{w_1} &> M_{w_3} \\ +W_{u_2} &= -C_{u_2} \\ U_{n+1} &> -U_n \end{aligned} \quad (2)$$

$\pm W_{u_{n+1}} = \pm C_{u_n}$ (in general for stage exit vectors)

$\omega_1 = \omega_2$ $W_{u_2}$ is made equal to $C_{u_2}$ in scalar terms by choice, for the first stage only, as shown in FIG. 25, where:

$M_{w_1}$ is the local Mach number at the entry to the first stage;

where $$M_{w_1} = \sqrt{\frac{W_1^2}{A_{0_1}^2 - \frac{K-1}{2}C_1^2}}$$

in scalar values;

$M_{w_3}$ is the local Mach number at the entry to the second stage;

where $$M_{w_3} = \sqrt{\frac{W_3^2}{A_{0_2}^2 - \frac{K-1}{2}C_3^2}}$$

in scalar values;

$W_{u_2}$ is the peripheral component of $W_2$; ft./sec.
$W_2$ is the relative velocity at the exit from the first stage; ft./sec.
$C_{u_2}$ is the peripheral component of $C_2$; ft./sec.
$C_2$ is the absolute exit velocity at the exit from the first compression stage; ft./sec.
$n$ is the number of any stage.
$\omega_1$ is the angular velocity of the first rotor of the compressor; ft./sec.
$\omega_2$ is the angular velocity of the second rotor of the compressor; ft./sec.
$A_{0_1}$ is the (static) sonic velocity in the gap before the first rotor; ft./sec.
$A_{0_2}$ is the (static) sonic velocity in the gap before the second rotor; ft./sec.
$K$ is the ratio of specific heats in the given gap between two rotors;
$C_3$ is the absolute entry velocity into the second rotor; ft./sec.

In the above designation of the velocities, in the specification as well as in the drawings, the velocity changes that actually do occur in the inter-stage air gaps are neglected. This simplifies the nomenclature of the velocities and it is unnecessary to consider these velocity changes in the specification because they are not relevant insofar as the invention is concerned. These intergap velocities are always considered in designing the compressors and, therefore, neglecting of these velocity changes here is purely for simplifying the nomenclature as well as the entire disclosure. However, it is not meant to convey the impression that these velocity changes are so insignificant that they can be neglected all the way around, even in the actual, practical design work. This, of course, is not the case.

Another exception should be also mentioned here and that is FIGURE 25. For a more accurate geometric presentation of all the velocity vectors and their angular relationships with respect to each other, the inter-gap velocity changes have been considered insofar as the construction of the geometric lines is concerned, but the nomenclature of the vectors, nevertheless, still remain the same as that used in the specification, i.e., the inter-gap velocity changes are neglected. Therefore, for example, the relative exit velocity from the first stage is designated as $W_2$ and the absolute exit velocity is designated as $C_2$. The entry velocities into the succeeding rotating stage are then designated as being $W_3$ and $C_3$ and it is also indicated that $C_2 \equiv C_3$, which is the equivalent to the designation in the algebraic form that the change in the inter-stage gap velocities is neglected. The above should be kept in mind in reading the specification as well as interpreting the meaning of the vectors in the vectorial diagrams.

In centripetal compressors, the absolute entry velocity into any rotor is greater than the absolute exit velocity from the immediately preceding rotor. This change is due to the free vortex law in the gap and has been neglected throughout the entire text, for reasons of simplicity.

Before proceeding with a detailed description of several versions of the method disclosed here, it would be helpful to outline briefly the nature of these versions.

(1) The first version of the method improves the performance of the compressor by making $W_{u_2}$ smaller than $C_{u_2}$ which is accomplished, firstly, by increasing the angle of turning $\epsilon_1$ of the first stage which is accomplished by increasing the camber and solidity of the first stage, and secondly, by increasing the angle of approach of the second stage. In this case, the vectorial relationship then becomes as follows:

$$-U_1 > +U_3 \qquad (3)$$
$$M_{w_1} = M_{w_3}$$
$$\pm W_{u_2} < \pm C_{u_2}$$
$$\omega_1 = \omega_2$$

The above relationship also increases $W_3$, which increases the "loading" of the second stage. $C_{u_2}$ is made large enough to make $W_3$ so large that the local Mach number $M_{w_3}$ is made equal to $M_{w_1}$. The end result is that the compressor can create a static pressure head which is higher than the static pressure head obtainable with the classical compressor. No vector-adjusting stages are required in this version of the method. Higher compression ratio is obtained by making the vector diagram asymmetric. See FIGS. 2 through 4C.

(2) In the second version of the method, the conditions are identical to those in the first version but the peripheral velocity $U_3$ is made equal to $U_1$. Accordingly, the angular velocity $\omega_2$ of the second, or inner rotor is made higher than the angular velocity $\omega_1$ of the first, or outer rotor, the first rotor having a larger diameter than the diameter of the second rotor. The vectorial relationship, therefore, becomes as follows:

$$-U_1 = +U_3 \qquad (4)$$
$$M_{w_1} = M_{w_3}$$
$$\pm W_{u_2} < \pm C_{u_2}$$
$$\omega_1 < \omega_2$$

This compressor can create a total pressure head which is higher than the total pressure head obtainable with the compressor of the first version because of the increase in $U_3$.

(3) In the third version one encounters the following conditions: The kinetic energy of the compressed fluid at the exit from the first stage, in the form of $C_2$ and its peripheral component $C_{u_2}$ (see FIG. 6) is so high that it cannot be effectively converted into pressure without exceeding the stipulated Mach number $M_{w_3}$ for the second stage. As will be explained later in a more detailed discussion of the third version of this invention, this vectorial relationship occurs because the angle $\alpha_2$, which is the angle formed by $C_3$ with the radial line 200, FIG. 2, is so large that the corresponding peripheral component of $C_3$, which is $C_{u_3}$ (in FIG. 2 it is designated as $C_{u_2}$ because it is assumed here that $C_2 \approx C_3$; this is a reasonably close approximation) is so large that when it is combined with the peripheral velocity vector $U_3$ (representing the speed of travel of the outer rim of the second compression stage), the relative velocity vector $W_3$ becomes excessively large. What is meant here by the expression that the velocity vector $W_3$ becomes excessively large is that under such circumstances the local Mach number $M_{w_3}$ at the entry into the second stage will exceed 1.0 in subsonic or sonic compressors or will exceed a predetermined Mach number greater than 1 in a supersonic compressor. Therefore, the only way that it would be possible under such circumstances to make the second stage work at a lower Mach number, would be by reducing all three vectors, i.e., $C_{u_3}$, $U_3$, and $W_3$. Any reduction of $U_3$ would reduce the total head produced not only by the second stage, but also by all the remaining inner stages of the compressor and therefore, an effective solution of the encountered problem cannot be looked for in the reduction of the magnitude of the peripheral velocity vector $U_3$. If anything, $U_3$ must remain constant and, for higher total head, which will be described more fully later, $U_3$ should be made equal to $U_1$ and, in some instances, it is made even higher than $U_1$. This being the case, it follows that there is only one vector which can be reduced in its magnitude without diminishing the total head, and that is the $C_{u_3}$ vector. It should be realized here at once that the reduction of the $C_{u_3}$ vector should be accomplished here without sacrifice in the magnitude of the absolute flow velocity vector $C_2$ for the same reasons that were mentioned in connection with the vector $U_3$, i.e., if the reduction in the magnitude of $C_{u_3}$ were to be accomplished by reducing the magnitude of $C_2$, such a reduction would be accomplished only at the expense of the compression ratio or total head of the compressor.

Stated differently, any reduction in $C_2$ or $C_3$ would at once produce a corresponding reduction in the over-all pressure head produced by the compressor. Accordingly, in this case, one encounters the following dilemma: one cannot reduce the magnitude of $U_3$, one cannot reduce the magnitude of $C_2$ or $C_3$ without experiencing a corresponding loss in the total pressure head. In addition, it also should be stated here that no appreciable change can be obtained in the angle $\alpha_2$ because the magnitude of this angle is determined by the maximum turning angle $\epsilon_1$ that can be obtained in the first compression stage without producing separations in the flow channels of the first stage. It may be mentioned here, if only parenthetically, that the maximum turning angle $\epsilon_1$ of the first stage may be in the order of 70°, and it would be more common to have this turning angle in the order of 60°. This at once fixes the magnitude of $\alpha_2$, the design magnitude of which generally is between 35° and 45°.

The third version of this method introduces a stationary vector-adjusting stage between the first and the second compression stages. This vector-adjusting stage is capable of receiving $C_2$ irrespective of its magnitude and direction and it is capable of changing the direction of this vector, without reducing its magnitude, to any desired extent by reducing angle $\alpha_2$ to any desired extent. As will be pointed out later more fully, this vector-adjusting stage also somewhat reduces the magnitude of vector $C_2(C_2 \equiv C_3)$ which is accomplished by obtaining a certain limited amount of diffusion in this vector-adjusting stage. Accordingly, the meaning of the term "vector-adjusting stage" as used in this specification means a stationary stage which receives the compressed fluid having one velocity vector, defined by its magnitude, direction of flow, such as $C_3$, and discharges this compressed fluid at a slightly lower velocity and different direction corresponding to a vector $C_4$ in FIG. 6. The angle formed by $C_3$ with the radial line 600 in FIG. 6, which is angle $\alpha_2$, is larger than angle $\alpha_4$, formed by $C_4$ with line 600. Accordingly, vectorially, one obtains the following relationship:

$$-C_3 > -C_4 \qquad (5)$$
$$\alpha_2 > \alpha_4$$

The vectorial relationship and the Mach number relationship in the third variation of the invention, utilizing the vector-adjusting stage, FIG. 6, becomes as follows:

$$-U_1 \leqq +U_5 \qquad (6)$$
$$M_{w_1} = M_{w_5}$$
$$W_{u_2} < -C_{u_2} \equiv -C_{u_3} \text{ (absolute magnitudes)}$$
$$-C_{u_3} > -C_{u_4} \text{ (absolute magnitudes)}$$
$$\omega_1 < \omega_2 \text{ (absolute magnitudes)}$$

The significance of the first expression given above, i.e., that $U_1$ may be equal, or approximately equal to or less than $U_3$, is that the introduction of the vector-adjusting stage enables one to have much greater freedom in the design of all stages of the compressor following the vector-adjusting stage and one of the gained freedoms resides in the fact that it becomes possible to make $U_3$ either equal to $U_1$ or even larger than $U_1$ by making $\omega_1 < \omega_2$. Accordingly, in the group of Expressions 6 it also includes the following (vectorially):

$$-U_1 < +U_3 \qquad (7)$$

It is described more fully under the fourth version of the method. From a fluid-dynamic point of view, the scalar magnitude of $U_3$ in this case becomes limited only by $M_{w_3}$, which should not exceed $M_{w_1}$ that may have any value assigned to it as a pre-determined characteristic parameter of the compressor. Accordingly, the introduction of the vector-adjusting stage enables one to produce a compressor with a constant Mach number in at least the first four compression stages. It will be pointed out later that, by introducing an additional vector-adjusting stage or stages, it is entirely practicable to produce a subsonic centripetal compressor in which the local Mach number remains approximately constant throughout the compressor. The constant Mach number throughout the compressor enables a centripetal flow contra-rotatable compressor to become by far the highest total head compressor for a given number of stages. This high head, and the high compression ratio determined by it, is obtained with a mechanical structure and metals (conventional steel) which are much simpler and much cheaper than the structures of the axial flow or centrifugal flow compressors that would be necessary for obtaining the same compression ratio. The above superiority is also obtained at much lower peripheral velocities.

(4) In the fourth variation, $U_3$ is made larger than $U_1$. This means that the peripheral velocity of the outermost compression stage of the second rotor is made larger than the peripheral velocity of the first stage ducts $\omega_1 < \omega_2$.

In this version, the vectorial and the Mach number relationships become as follows (vectorially):

$$-U_1 < +U_3 \qquad (7a)$$
$$\omega_1 < \omega_2$$
$$M_{w_1} \leqq M_{w_3}$$
$$W_{u_2} < -C_{u_3} \equiv -C_{u_2}$$
$$C_{u_3} > C_{u_4}$$

(5) In the fifth version of the method, the vector and the Mach number relationships are as follows (vectorially):

$$-U_1 \neq +U_n \qquad (8)$$
$$M_{w_1} \neq M_{w_n}$$
$$W_{u_2} \neq -C_{u_n}$$
$$W_{u_2} < -C_{u_n}$$

where $U_n$, $M_{w_n}$ and $C_{u_n}$ relate, or refer, to the nth stage of the compressor; the nth stage being the first stage of the second rotor after, or which follows, the last vector-adjusting stage. Therefore, it is one of the intermediate stages of the compressor. It is most likely that in this case the compressor will have more than one vector-adjusting stage.

This version of the method relates to the supersonic region of compressing an elastic fluid.

*Subsonic Compressor With Two Rotors Contra-Rotating at Two Opposite and Equal Angular Velocities but Having an Asymmetric Vector Diagram:*

$$\omega_1 = \omega_2$$

The type of compressor outlined in the above title is the first variation of the method. It is illustrated in FIGS. 1 and 2. FIG. 1 is the transverse cross-section of the compressor in a plane perpendicular to the axis of rotation and FIG. 2 is the vector diagram for this compressor.

Only three stages are illustrated in FIG. 1; they are the stationary contraprerotation stage 100, the first compression stage 101 and the second compression stage 102. The stator stage 100 has a plurality of cambered airfoils 103. The fluid enters the stator stage with a velocity $C_0$ and leaves this stator stage with a velocity $C_1$.

It will be assumed here, and throughout the specification, that the exit velocities from the stages are equal to the entry velocities into the succeeding stages, and therefore, $C_1$ will be also considered as the absolute entry velocity of the fluid into the first compression stage (also, $C_2 \approx C_3$; $C_4 \approx C_5$, etc.). Actually, there is a slight increase in the absolute velocities as the fluid crosses the interstage gaps; this increase need not be considered for the understanding of this invention, although, in actual design of the compressors, these changes are taken into consideration.

Sufficient amount of contra-prerotation is imparted by the stationary contra-prerotation stage 100 so that the direction of the relative velocity $W_1$ coincides with the median flow line 104 of the flow channel in the first compression stage at the point of entry of $W_1$ into this stage, as is indicated in FIG. 1.

The first compression stage has a plurality of cambered airfoils 105, the camber being in the direction of rotation illustrated by an arrow, 106. The peripheral velocity of the outer rim is $U_1$ while that of the inner rim is $U_2$. The profile of the airfoils 105 was discussed earlier.

The second compression stage 102 is similar to the first stage. The airfoils 107 in general are of the same type as those in the first stage and the only difference between the first stage and the second, resides in the fact that the angles of stagger, $\gamma_1$ and $\gamma_2$ are different, the angle of stagger $\gamma_1$ of the first stage being larger than $\gamma_2$. The variations of the airfoils from stage to stage is determined to a large extent by economic considerations which indicate the use of as few different airfoils in the compressor as possible. However, for obtaining as high Reynolds numbers as possible, particularly in the first stages, it may be advisable to use a particular airfoil having a longer chord than the chord of the airfoils used in the remaining stages of the compressor and this may lead one to the use of differently cambered airfoil and having different thickness in the first compression stage than in other stages; for example, the first stage may have airfoils of the NACA–65(18)10 type, while the succeeding stage may have an airfoil of the NACA–65(16)09 type. The solidity of the respective stages is controlled primarily by the angle of turning; the larger is the angle of turning, the larger is the solidity of the stage so long as the profile of the airfoils remains the same; on the other hand, turning should be controlled by the camber of the blades instead of by variations of solidity.

The vectors for the second stage are $C_3$, $W_3$ and $U_3$; $C_3$ is the absolute velocity of the fluid at the entry into the second stage, $U_3$ is the peripheral velocity of the outer rim of the second stage, and $W_3$ is the relative velocity of the fluid at the entry into the second stage. The vectors at the exit from the first stage are $C_2$, $W_2$ and $U_2$. It is the position of these vectors with respect to the radius line 200 that differs from the position occupied by the same vectors wtih respect to the same radius line 2504 in the classical compressor that differentiates this compressor from the classical compressor.

As mentioned previously, in this case $W_{u_2}$, illustrated in FIGS. 1 and 2, is made smaller than $C_{u_2}$ which is achieved by increasing the angle of turning $\epsilon_1$ of the first stage. It is the angle subtended by the relative velocity vectors $W_1$ and $W_2$. It is increased until $C_{u_2}$ is sufficiently large to make the local Mach number $M_{w_3}$ at the entry into the second stage 102 equal to the local Mach number $M_{w_1}$ at the entry into the first stage 101. This process of adjusting the respective angles of turning of the respective compression stages continues throughout the compressor until the last stage, where the angle of turning is determined by the desired angle of exit of the absolute velocity $C_n$.

The vector relationship of the velocity component and of the local Mach numbers within the compressor in this case, is therefore of the type indicated by the group of Equations 3.

It is impossible to obtain a constant Mach number in all of the compression stages in this case because $\omega_1=\omega_2$ and there is a decrease in the peripheral velocity of the stages as one progresses from the outer toward the innermost stage of the compressor. However, it is possible to obtain a constant entry Mach number in at least the first three compression stages and, what is equally important, the decrease in the local Mach numbers in the remaining stages is not as rapid in this case as in the classical compressor, with the result that all stages, without a single exception, are more heavily loaded and, therefore, produce higher total head per stage than the corresponding stages in the classical compressor.

The above statement should be qualified by noting that the total head of the first stage of the compressor would be identical in both cases, so that the gain in the total compression is obtained in this case in the stages which follow the first stage. Also, the gain in the total head in this case is not as high as in the subsequent cases which will be described below. Nevertheless, even in this least favorable case, where no vector-adjusting stages are used, and $\omega_1=\omega_2$, this gain in the total mechanical head for the entire compressor may be in the order of 30%, this entire gain being achieved by a mere adjustment of the blade angles and vectors, rather than by any additional structural means.

*Subsonic Compressor with Two Rotors Contra-Rotating at Two Opposite Unequal Angular Velocities: $\omega_1<\omega_2$*

The general configuration of this compressor is similar to that illustrated in FIG. 1 and therefore, FIG. 1 may be used for its description.

The primary difference between the compressor illustrated in FIG. 1 and that contemplated here resides in the fact that in this case, as indicated in FIG. 3, $\omega_1<\omega_2$, and $U_3=U_1$. Therefore, the stationary contra-prerotation stage is identical to that illustrated in FIG. 1. The first stage will differ from that illustrated in FIG. 1, in that its angle of turning $\epsilon_1$ will be smaller than the same angle in FIG. 1 for the same Mach numbers. In FIGS. 2 and 3, the turning angles $\epsilon_1$ are equal but the Mach numbers for FIG. 3 would be higher than the corresponding Mach numbers in FIG. 2, and the Mach number would be much higher for $W_5$ in FIG. 3 since $W_5$ in FIG. 3 is much greater than $W_5$ in FIG. 2. In both cases the stagger angle of the second stage will remain the same. The remaining odd-numbered stages will have a larger stagger angle because in this case, the components $W_{u_2}$, $W_{u_6}$, $W_{u_{10}}$, etc., will all be larger than in FIG. 2. The vectorial relationship in this case is illustrated in FIG. 3, and if this figure is compared with FIG. 2, then the following relationships are produced:

$$b<b \qquad (9)$$
$$a<a$$
$$b'<b'$$
$$a'>a'$$
$$c<c$$
$$d<d$$
$$\epsilon_1=\epsilon_1$$
$$\epsilon_2<\epsilon_2$$
$$M_{w1}<_{w1}$$
$$M_{w3}<M_{w3}$$
$$M_{w5}<M_{w5}$$

The above may be generalized by saying that all of the $C_u$ components in FIG. 3 on the right and left sides of the radius line 300 have been increased, with the exception of $a'$ because of the increase in the peripheral velocity, $U_3$, of the second rotor and over-all increase in the Mach number in FIG. 3. Because of the higher Mach number for all the stages in FIG. 3, it becomes necessary to transfer some of the kinetic energy from the first and second stages to the succeeding stages, and this has been accomplished by increasing $W_u$ components, such as $W_{u_5}$, on the left side of the radius line 300.

This compressor, obviously, will produce a higher total head than the compressor of the first version.

*Subsonic Compressor With Two Rotors Contra-Rotating at Two Opposite Angular Velocities: $\omega_1<\omega_2$*

FIGS. 4A–B–C illustrate three possible changes in the vectors if the peripheral velocity $U_1$ is increased to a peripheral velocity $U_1'$. In FIG. 4A the angles or positions of $W_1$ and $C_1$ with respect to the reference line 400 remain constant and therefore the only change that is produced by the increase in $U_1$ is that illustrated by dotted lines in this figure. The original vector triangle $U_1W_1C_1$ becomes larger and all of the vectors also become larger. This has been accomplished by extending $W_1$ to $W_1'$, $C_1$ to $C_1'$ until the distance between $W_1'$ and $C_1'$ is sufficiently large so as to accommodate the large vector $U_1'$. This increase in $U_1$ to $U_1'$ and of $U_2$ to $U_2'$ is also reflected in the vertors representing the vectorial relationship at the exit from the first stage by the corresponding increase in the magnitudes of $C_2$ to $C_2'$ and $W_2$ to $W_2'$ without any change in their angles. If the local Mach number at the entry into the first stage $M_{W_1}$, is less than 1.0, this solution of the problem is entirely feasible so long as the increase in $W_1$ is such as not to exceed the Mach number. Immediately after the .99 Mach number is exceeded, the solution becomes untenable and one must look for some other solutions which are described below in connection with FIGS. 4B and 4C.

In FIG. 4B the angular relationship of the vectors $C_1$ and $U_1$ remains the same, but the angular position and magnitude of vector $W_1$ has been changed by extending to the left that part of $U_1$ which represents an increase in the peripheral velocity. Accordingly, the larger is the change from $U_1$ to $U_1'$, the larger will be the change in the magnitude of $W_1$ from $W_1$ to $W_1'$, and of angle $\beta_1$ from $\beta_1$ to $\beta_1'$, that $W_1$ and $W_1'$ respectively, form with the radial line 400. As to the magnitude of $W_1$, as long as $W_1$ does not exceed the local Mach number of .99, this method is a feasible method. This solution, however, may not be feasible if the increase in the approach angle $\beta_1$ is too large. The discussion of the optimum angles for the first compression stage will be given after concluding the discussion of FIG. 4C. $U_2$, $U_2'$, $\beta_2$, $\beta_2'$, $W_2$, $W_2'$, are the corresponding vectors at the exit from the first compression stage for two velocities $U_2$ and $U_2'$.

In FIG. 4C, an increase in $U_1$ is accomplished by changing the magnitude as well as the angle of the absolute velocity $C_1$. $U_1$ is extended to the right and $C_1$ is changed to $C_1'$. From a purely vectorial point of view, this obviously is a feasible solution, and it is also feasible from the point of view of the local Mach number. The local Mach number in this case will not be exceeded because the magnitude of $W_1$ remains constant. The other changes that take place at the exit from the first compression stage with the increase of $U_1$ to $U_1'$ and the changing of angle $\alpha_1$ to $\alpha_1'$ and $C_1$ to $C_1'$ are as follows: $\alpha_2$ becomes $\alpha_2'$, $C_2$ becomes $C_2'$, and $U_2$ becomes $U_2'$.

However, other complications immediately arise in connection with FIG. 4C. For example, the angle of acceptance $\alpha_1$ changes quite rapidly and the magnitude of $C_{u_1}$, which is the peripheral component of $C_1$ (since line 400 is passing through the center, or the axis of rotation, $C_{u_1}$ is at right angles to line 400) is decreasing very rapidly as $\alpha_1$ approaches zero and, after this, the angle swings over to the right of the radial line 400. $C_{u_1}$ then changes its sign. In the notation used in this specification, $C_u$ is positive when it lies to the right of line 400, and negative when it lies to the left of line 400.

In general, total head of the first stage is given by the following equation (this equation applies to any stage, single or contra-rotating, as long as proper velocity vectors are used in the equation):

$$-\Delta L = \frac{1}{g}(-C_{u_1}U_1 - C_{u_2}U_2) \frac{\text{ft. lbs.}}{\text{lb.}} \quad (10)$$

where $\Delta L$ is a mechanical head in $\frac{\text{ft. lbs.}}{\text{lb.}}$;

$g$ is acceleration due to gravity, ft./sec.$^2$;

$C_{u_1}$ is the peripheral component of the absolute velocity vector $C_1$;

$C_1$ is the absolute velocity of fluid at the entry into the first compression stage;

$C_{u_2}$ is the peripheral component of the absolute exit velocity vector projected upon the tangential direction, ft./sec., and in centripetal compressors is usually opposite in sign to $C_{u_1}$;

$C_2$ is the absolute velocity of fluid at the exit from the first compression stage;

$U_1$ is the peripheral velocity at the entry into the first compression stage, or the peripheral velocity of the outer rim of the first compression stage, ft./sec.;

$U_2$ is the peripheral velocity of the inner rim, or at the exit from the first stage, ft./sec.

$\Delta L$ has a negative sign because it represents power input into the compressor, or a shaft power supplied by an external source. This equation expresses the total conversion of mechanical energy by a compressor stage into pressure head energy and kinetic head energy. The obsolute value of this equation should be as high as possible in order to obtain maximum energy conversion from any given stage. The highest mechanical heads are obtained if both terms in the bracket of Equation 10 can be made negative and numerically as large as possible. The peripheral component $C_{u_1}$ has a positive value so long as $C_1$ and $C_{u_1}$ are to the left of the radius line 400, making the first term, $C_1U_1$, negative since the vector $U_1$ has a negative sign. The second term in the brackets, $C_{u_2}U_2$, is a positive product with a negative sign before it, because $C_{u_2}$ is negative and $U_2$ is also negative. Therefore, Equation 10 for the vector diagrams illustrated in FIGS. 4A to 4C will have two negative terms on the right side of the equation so long as $C_1$ is on the left side of the reference line 400 which produces large absolute values for the head $\Delta L$. If now the increase of the peripheral velocity $U_1$ is accomplished at the expense of shortening of the vector $C_{u_1}$, the total mechanical head is decreased (its absolute value) and if the velocity $U_1$ is made equal to the peripheral component $W_{u_1}$ of the relative velocity $W_1'$, then the peripheral velocity vector $C_{u_1}$ becomes equal to zero. In this case, the total mechanical head converted by the first stage is equal to:

$$-\Delta L = -\frac{1}{g}C_{u_2}U_2 \quad (11)$$

A further increase of the peripheral velocity $U_1$ results in transferring the position of vector $C_1$ to the right side of radius line 400 and in setting up new angles of approach $\alpha_1'$ (FIG. 4C) which causes the absolute velocity $C_1'$ to have a negative peripheral component $C_{u_1}'$. It can then be seen that the total head is equal to:

$$-\Delta L = \frac{1}{g}(+C_{u_1}'U_1' - C_{u_2}'U_2') \quad (11a)$$

The capability of the stage to convert mechanical energy into compression is diminished relative to (11), although the total energy conversion is increased, due to the increased velocity, from $U_1$ to $U_1'$. Accordingly, it is undesirable to increase $U_1$ by extending it in the manner indicated in FIG. 4C. If possible, it is desirable, therefore, for the peripheral component $C_{u_1}$ to have a positive sign to the left of radius line 400 and numerically to be as large as possible as long as its magnitude produces a proper angle of approach $\alpha_1$ and also the proper inflow angle $\beta_1$. The optimum values of these angles as as follows:

$\alpha_1$ = any angle which is to the left of the radial line 400 so as to make $C_{u_1}$ have a positive sign; (12)

$\beta_1$ = approximately 60° but preferably more than 60°.

The value of $\alpha_1$ determines the value of the inflow angle $\beta_1$ and it has been indicated above that the optimum value of this angle is between 60° and 70°. It is possible to make this angle as large as 77°.

In view of the above the optimum vector triangle at the entry into the first stage, is that illustrated by solid lines in FIGS. 4a–b–c, which is the triangle $W_1$, $U_1$, $C_1$ in which $U_1$ is that maximum peripheral velocity which is attainable with the presently available metals. This maximum velocity is in the order of 1200 feet per second with presently available steels and there is every reason to believe that improvements in the metallurgical arts will enable one to have higher velocity as the strength of the metals is improved.

This most favorable vector triangle for the input into the first compression stage produces a vectorial relationship $W_2$, $U_2$ and $C_2$ at its output, in which $-C_{u_2}$ is larger than $W_{u_2}$. The magnitude of $C_2$ and the relationship between $-C_{u_2}$ and $W_{u_2}$ is determined in the main by the flow turning angle $\epsilon_1'$, subtended by the relative velocities $W_1$ and $W_2$. It will be pointed out below that $-C_{u_2}$ should be made as large as possible for making $M_{w_3} \to .99$, which means that the flow turning angle $\epsilon_1$ will have to be larger in the contemplated compressors than the magnitude of the same angle in the classical compressors.

Larger turning angles $\epsilon_1$ than has been found feasible in the axial compressor art are possible in centripetal compressor cascades. The cascades in these latter compressors are two-dimensional all along the length of the blades, therefore have uniform spacing or solidity ratio. While the maximum solidity in the axial compressors normally does not exceed 1.5 or less, the solidity of cascades in the centripetal compressors can be easily above this value, of the order of 2.5 and even more, determined on the mean periphery of the stage. The limitation of variable solidity from low to high in the same stage is not present in centripetal compressors. High solidity cascades are capable of large turning angles $\epsilon_1$, and, therefore, have high energy conversion capabilities without exceeding the limits of parameters determining the efficient flow through these cascades. Turning angles $\epsilon_1$ in the order of 60° to 70° are possible for illustrations 4A, 4B and 4C instead of the mere 30° with which the illustrations were prepared to make the new principles more comprehensive to those familiar with the axial compressor art, which includes all technical workers in this profession. Therefore, the staging illustrated in FIGS. 1, 8, 11, 14 and 17 is only a diagrammatic representation of the staging which is used primarily for indicating the location of the velocity vectors.

Before proceeding with the concluding part of the description of FIGS. 4A–C, it is necessary to digress here to point out the meaning of the term "flow turning angle $\epsilon$" as used in this specification.

FIG. 5 illustrates the true geometry of the geometrical turning angle. A single airfoil 500, is positioned between the two radial lines, $R_1$ and $R_2$, subtending the chordal angle $\psi$. The geometrical turning angle $\theta$ is the angle subtended by the relative velocities $W_1$ and $W_2$, and is equal to:

$$\theta_1 = \epsilon_1 + \psi_1 = (\beta_1 - \beta_2) + \psi_1 \tag{13}$$

because in a centripetal compressor point 502 is located at the outer periphery of the compressor stage, while point 504 is located at the inner periphery of the compressor, and the air flow has an angle of in flow $\beta_1$ with respect to the radius line 400, while the blades are set in the cascade at a stagger angle $\gamma_1$, between the blade chord line 505 and the radius line 400.

The geometrical turning angle $\theta$ is equal to what is indicated in Equation 13. As long as point 502 and point 504 are displaced from each other by angle $\psi$ because of the peripheral displacement of the leading and lagging ends of the airfoil 500, it becomes necessary to introduce this angle into the expression for the geometrical turning angle. This angle does not appear in any of the FIGS. 4A–4C for simplifying the vector diagrams of the compressor. Accordingly, all vector diagrams are represented as if they were following the radial line 400 from the entry to the exit of the compressor, whereas actually this is not the case in view of what is illustrated in FIG. 5. Accordingly, this correction should be kept in mind in considering all vector diagrams in this specification.

The following definition of the angles will be used throughout this specification:

$\alpha_1$ = Approach angle
$\beta_1$ = Inflow angle
$\beta_2$ = Outflow angle
$\gamma$ = Angle of stagger
$\psi$ = Chordal angle (14)
$\theta$ = Geometrical turning angle
$\alpha_D$ = Angle of attack
$\alpha_2$ = Absolute exit angle
$i$ = Angle of incidence
$\epsilon_1 = \beta_1 - \beta_2$ = Aerodynamic flow turning angle Reverting once more to FIGS. 4A–4C, the following conclusions follow from the description of these figures: A large absolute vector velocity $C_2$ appears at the exit from the first stage and at the entry into the second stage. This vector $C_2$ subtends a relatively large angle $\alpha_2$ with the radial line 400 making $C_{u_2}$ larger than $W_{u_2}$. Angle $\alpha_2$ is governed by the magnitude of the velocity $U_2$ and the flow turning angle $\epsilon$ which should not be made so small as to make $C_{u_2}$ smaller than $W_{u_2}$. If this were done, then such reduction in angle $\epsilon$ would be done at the expense of the amount of work done by the first stage. In low solidity cascades inherited from axial compressors and applied to the new centripetal compressors, the optimum value of angle $\theta$ is in the order of 35° to 40° for conventional cascades having conventional airfoils and conventional solidities, while the flow turning angle $\epsilon_1$ is in the order of 30° to 36° for the same conditions. Even when such low solidity cascades should be used in centripetal compressors of this invention, the magnitude of $\mp C_{u_2}$ is considerably larger than the magnitude of $\pm W_{u_2}$. For example, in one specific case, with the local Mach number equal to .68, the value of $-C_{u_2}$ is in the order of 425 feet per second, while the value of $+W_{u_2}$ is in the order of 210 feet per second.

The above values are for a compressor having an unusually low Mach number. With the Mach number increased to 0.9, or .99, the value of $C_{u_2}$ will become much larger while the magnitude of $\pm W_{u_2}$ will remain the same. When such conditions are encountered, i.e. $\mp C_{u_2} \gg \pm W_{u_2}$ (vectorially) it becomes impossible to receive the absolute velocity $C_2$ in the second compression stage without exceeding the local Mach number at the entry into the second compression stage. Stated differently, the second stage than becomes a supersonic stage. Instead of making $\mp C_{u_2} = \pm W_{u_2}$, as was done in the classical compressor (FIG. 25), much greater mechanical heads are obtainable by introducing a stationary vector-adjusting stage between the first and second compression stages, this vector-adjusting stage somewhat reducing the magnitude of a very large $C_2$ and also changing its angle $\alpha_2$ so as to make $\mp C_{u_2}$ smaller than $\pm W_{u_2}$.

*Centripetal Subsonic Compressor With Two Contra-Rotating Rotors and a Vector-Adjusting Stage Between Two Contra-Rotating Compression Stages*

The above is illustrated in FIG. 6 which is the vector diagram for the vector-adjusting stage and the compression stage which follows the vector-adjusting stage. This vector diagram begins with the absolute velocity $C_1$ which is the absolute exit velocity from the stationary contra-prerotation stage. It already has been indicated before that this exit velocity will have the magnitude and direction for obtaining maximum mechanical head. Because of high $U_1$, $C_2 > C_1$ and $C_2$, if $C_2$ were used directly in the second compression stage that would follow the first stage, it would result in a relative velocity $W_3$ and a local Mach number greater than .99. This is indicated in the dotted lines by the relative velocity $W_3$ and peripheral velocity $U_3$ of such stage. It has already been pointed out before that such solution is undesirable in a subsonic compressor.

The solution that is illustrated vectorially in FIG. 6 is illustrated by the vector $C_4$. Angle $\alpha_2$ now has been reduced to $\alpha_4$ which reduces $\mp C_{u_3}$ to $\mp C_{u_4}$. The absolute magnitude of $C_2$ has been reduced only slightly by converting $C_2 \equiv C_3$ to $C_4$. The decrease in the magnitude corresponds to the amount of diffusion assigned or alotted to the vector-adjusting stage. The amount of diffusion is determined primarily by the flow angle of turning $\epsilon_2$ and by the shape and solidity of the blades comprising the cascade of the vector-adjusting stage. This flow must be such as to prevent any flow separation on the upper, or the lagging, side of the blades. The above can be expressed by the following equation:

$$D = 1 - \frac{W_2}{W_1} + \frac{\Delta W_u}{2HW_1} < .75, \text{ max. for radical cascades held between two rings} \quad (15)$$

where $D$ = diffusion factor
$W_1$ = the relative entry, or inlet, velocity, ft./sec.
$W_2$ = the relative exit velocity, ft./sec.
$\Delta W_u$ = the difference between the peripheral components of the relative velocities $W_{u_1}$ and $W_{u_2}$, ft./sec., all scalar values;
$H$ = solidity of the rector-adjusting stage =
(cord of the blade)

―――――――――――
(blade spacing)

and $$\Delta W_u = W_{u_1} - W_{u_2}, \text{ ft./sec.}$$

For the derivation of Equation 15, the reader is referred to the NASA report #RM E53D01, 1953.

The factor $D = .75$ max. is an experimentally determined quantity. Examination of the vector $C_4$ and comparing of this vector with $C_2$ leads one to the conclusion that the main change that is produced by the vector-adjusting stage is in changing angle $\alpha_2$ to angle $\alpha_4$, the latter being considerably smaller than angle $\alpha_2$. This change in the angle of $\alpha$ is equal to the turning angle of the vector-adjusting stage which is angle $\epsilon_2$ indicated in FIG. 6. It is the angle subtended by $C_2$ and $C_4$. The angle is selected so that proper Mach number $M_{w_5}$ is obtained in the succeeding compression stages. The above is also indicated in FIG. 6 by the vector triangle $W_3'$, $U_3'$, $C_2$ in which $W_3$ must be made sufficiently large so as to make:

$$M_{w_3} = .99 \text{ max. at the design point} \quad (17)$$

The peripheral velocity $\pm U_3$ in this case may be either numerically smaller or equal to the peripheral velocity $\mp U_1$. In other words, the velocity of the outer periphery of the second rotor may be made equal to the velocity of the outer periphery of the first rotor. As previously mentioned, with the available metals in 1960 this velocity may be in the order of 1200 feet per second. For obtaining a maximum output or maximum compression ratio or maximum head from the compressor, it obviously is more advantageous to make numerically, $$\mp U_1 = \pm U_3 \quad (18)$$

rather than making $\pm U_3$ smaller than $\mp U_1$.

The description relating to FIGS. 4–6, therefore, can be summarized by stating that when large peripheral velocity is imparted to the first compression stage, it produces such a large absolute flow velocity $C_2$ that this latter velocity cannot be effectively accepted by the succeeding compression stage without exceeding the entry Mach number at the entry into the second stage. Rather than to limit the output of any given stage as it has been done in the past, this large kinetic energy is transmitted effectively by the vector-adjusting stage to the succeeding stages by changing the approach angle of the absolute velocity $C_4$ so that the Mach number in the succeeding compression stage, or stages, is equal to the design Mach number.

The introduction of the vector adjusting stage requires utilization of some space, and especially some of the available radial distance between the inner periphery of the first compression stage and the axis of the compressor. If, say for example, this vector-adjusting stage has a radial dimension equal to 1" (this distance may vary between 0.5" and 2", depending upon the size of the compressor) then this one inch of radial distance now has been taken up by the vector-adjusting stage and cannot be utilized for placing in its stead the second compression stage. This is a loss in a geometric sense but this loss is more than compensated for by the over-all gain achieved in the succeeding compression stages. This will be described more fully, and illustrated by means of the total head curves, later in this specification.

Referring to FIG. 7 which illustrates the cross-sectional view of the upper half of the compressor with one vector stage, the compressor includes a stationary frame 700 which supports an intake manifold or scroll 701. Fluid to be compressed enters scroll 701 and then enters the compressor proper because of the differential pressure which is created between the ambient pressure and the negative pressure created in gap 702, which is the gap bteween the first stage 704 and the stationary contra-prerotation stage 703. The first compressor stage 704 includes an outer hoop-ring 705 and an inner hoop-ring 706, the entire stage being supported by a first rotor disc 707. Disc 707 is supported by a bearing 708, only one bearing being visible in this figure and the second bearing being outside of FIG. 7. Disc 707 merges into a hollow shaft 709 used for conveying the compressed air either to a turbine or to some other consumer. This is illustrated by arrows 710 and 711, the same type of construction being used for the second rotor of the compressor. The first rotor of the compressor also includes compression stages 712 and 713, stage 713 being the innermost stage of the compressor. The second rotor 716 includes compression stages 714 and 715 which are supported by the second rotor disc 716 and a bearing 717. As in the case of the first rotor, disc 716 merges into a hollow shaft 718 which is also used as an air duct for conveying the compressed air. While the compressed air is conveyed outwardly by two hollow shafts 709 and 718 in opposite directions, either one of the shafts may be made solid so that the entire compressed fluid is conveyed through a single duct.

The description of the compressor given thus far does not differ in any material way from the subsonic compressor disclosed in the previously mentioned Patent #2,712,895.

The important difference between the classical compressor and the compressor disclosed in FIG. 7 resides in the introduction of the stationary vector-adjusting stage 720, which is held in fixed relationship with respect to the two rotors by means of an outer hoop-ring 722 and an inner hoop-ring 721 and frame 701.

The flow channel of the compressor, in the plane of the drawing, is proportioned to comply with the continuity equation.

Figure 8:
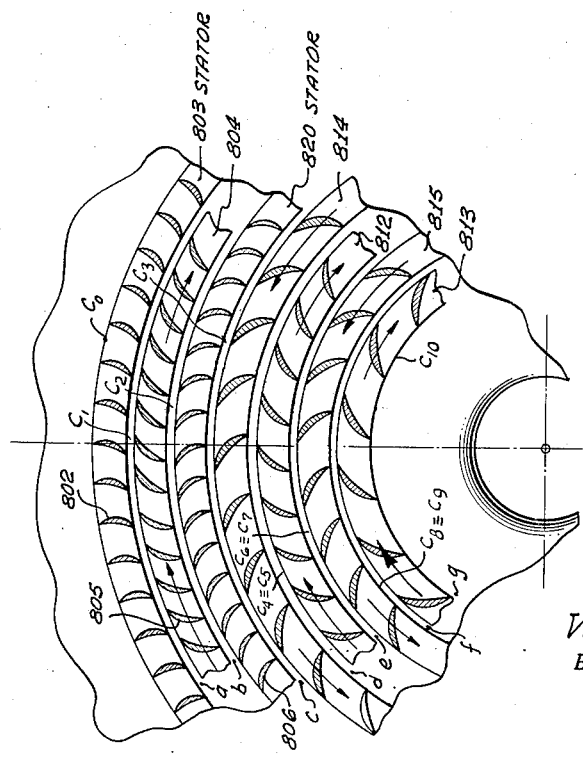

FIG. 8 discloses the cross-sectional view of the compressor taken along line 8—8 illustrated in FIG. 7. The first stator 803 is the contra-prerotation stage, having a plurality of blades 802. It is followed by the first rotor stage 804, having a plurality of blades 805, then follows the vector-adjusting stage 820, having a plurality of blades 806 which have an angle of acceptance so as to receive the compressed fluid leaving the first compression stage in such a manner that the absolute velocity $C_2$ is parallel to the median flow line in the flow channels of this stator stage 820 at the point of entry into this stage. The remaining stages of the compressor need no detailed description; the airfoils are of well-known types, but the angles of turning are proportioned so as to produce a vector diagram illustrated in FIG. 9.

Figure 9:
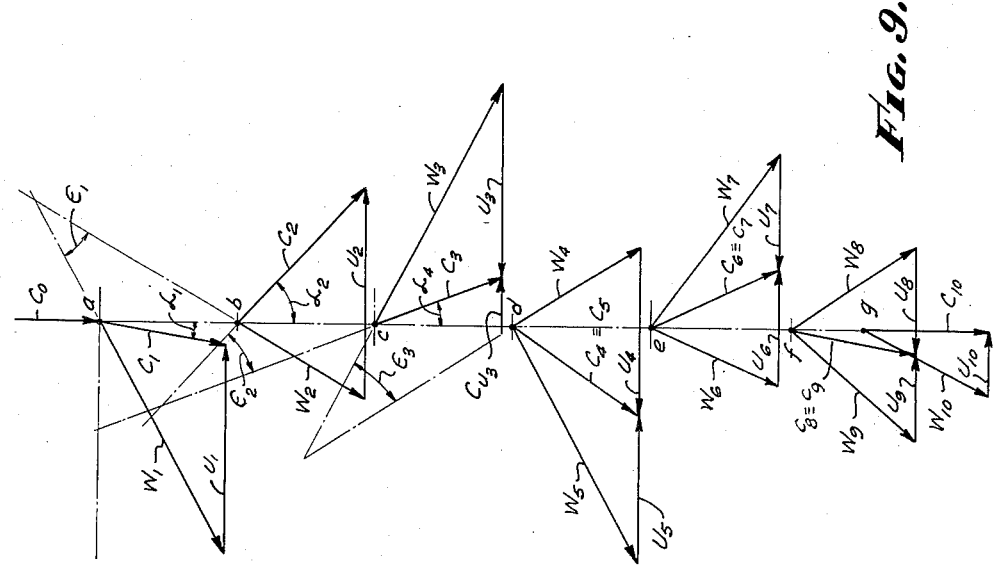

Referring now to FIG. 9, in view of the previously given description of FIGS. 4 and 6, it is possible to limit the discussion of FIG. 9 because some of the vector triangles appearing in FIGS. 4 and 6 are repeated in FIG. 9. For the sake of the completeness of the description, one may nevertheless start again with the entry velocity $C_0$ which, after passing through the contra-prerotation stationary stage 803, is changed to an exit velocity $C_1$ so that the fluid enters the first stage with the absolute velocity $C_1$. The relative velocity $W_1$ is sufficiently large to produce an entry Mach number which is either equal to or approaches .9 at the design point. The compressed fluid leaves the first compression stage with an absolute velocity $C_2$ whereupon it enters the vector-adjusting stage 820 and leaves this stationary stage with the absolute velocity $C_3$. The entry Mach number, at the entry into the second compression stage 817, also approaches .9. The compressed air then leaves the second rotor stage 814 with an absolute velocity $C_4$. The peripheral velocity $\pm U_3$ now has been made equal to $\mp U_1$, this increase in $U_3$ having been made possible by the introduction of the vector-adjusting stage 820. Because of such increase in $U_3$, the compressed air leaves the second compression stage 814 with the larger velocity $C_4$ and it enters the succeeding compression stage 812 at a correspondingly larger relative velocity $W_5$. The absolute velocity $C_5$ at the entry into the compression stage 812, which, for simplifying the vector diagrams, is made equal to the absolute velocity $C_4$, is sufficiently large so as to make the local entry Mach number $M_{w_5}$ at the entry into the compression stage 812 equal to .9. If there is any adjustment to be done at this point in the compressor, so as to make $W_5$, exactly of the right magnitude to make the local entry Mach number $M_{w_5}$ equal to .9, such adjustment is all done in the vector-adjusting stage primarily by varying the magnitude of the flow turning angle $\epsilon_2$. From then on the velocity diagram follows the same pattern as that illustrated for the stages 814 and 812, the turning angle of the stages being used for obtaining proper relative velocities in the succeeding stages, so that the stages would be loaded with a sufficient uniformity from stage to stage up to and including the innermost stage of the compressor. The Mach number problem does not arise from then on because the absolute velocities, such as $C_6$, $C_8$ and $C_{10}$, cannot be so large any longer as to cause any Mach number problem. This is due to the fact that the temperature of the compressed fluid is higher and the peripheral velocities of the succeeding stages diminish because only two rotors are used in this compressor. Therefore, the maximum velocity of 1200 feet/second, can be assigned only to the outermost stage of the first rotor and to the outermost stage of the second rotor. From then on, the peripheral velocities of all the remaining stages will be the direct function of the radial positions on the respective rotors, all of these peripheral velocities being smaller than $U_1$ or $U_3$.

It may be stated here, therefore, that a compressor with two rotors and a single vector-adjusting stage, produces a centripetal subsonic compressor where the local entry Mach number is constant for the first four compression stages.

*Subsonic compressor with two vector-adjusting stages each positioned between contra-rotating compression stages*

FIGS. 10, 11 and 12 disclose another version of the compressor where the principles discussed in connection with FIGS. 4–9 are carried out still further by introducing two stationary vector-adjusting stages 1002 and 1004.

The order of the stages in FIG. 10 is as follows: a stationary contra-prerotation stage 1000; a first compression stage 1001 mounted on the first rotor 1010; a vector-adjusting stage 1002 supported by a frame 1014; a second compression stage 1003 mounted on a second rotor 1012; a second vector-adjusting stage 1004 which is supproted by a ring 1016 and interconnecting rings 1020 and 1021 of the two stationary vector-adjusting stages; a third compression stage 1005 mounted on the first rotor 1010; a fourth compression stage 1006 mounted on the second rotor 1012; a fifth compression stage 1007 mounted on the first rotor 1010; a sixth compression stage 1008 mounted on the second rotor 1012; and, a seventh compression stage 1009 mounted on the first rotor 1010.

While there are only two vector-adjusting stages, 1002 and 1004 illustrated in FIG. 10, a larger number of the vector-adjusting stages may be used in the structure disclosed in FIG. 10, by continuing the arrangement of the compression and vector-adjusting stages still further, by connecting the additional vector-adjusting stages to a ring 1024 of the second vector-adjusting stage. Such multiplication of the vector-adjusting stages would be indicated only for the compressors having a very large outside diameter and a large number of compression stages for obtaining large total heads.

The first vector-adjusting stage 1002 is identical to the vector-adjusting stage 720 in FIG. 7. It is positioned between the first and second contra-rotating compression stages 1001 and 1003 which correspond to the compression stages 704 and 714 respectively of FIG. 7. The additional vector-adjusting stage 1004 is introduced for extending the constant local entry Mach number through a greater number of compression stages within the compressor. In this case, the absolute velocity $C_4$ at the exit from the second compression stage 1003 has a magnitude and an angle such that it requires an additional vector-adjusting stage, which is stage 1004, for changing $C_4$ to $C_5$ as illustrated in FIG. 12. The remaining vectorial relationships illustrated in FIG. 12 are similar to those illustrated in FIG. 9 after an absolute velocity $C_3$ and therefore need no additional discussion here.

The advantage of having an additional vector-adjusting stage 1004 resides in the fact that the constant local entry Mach number now can be extended to at least the fifth compression stage and even to the sixth compression stage, thus making it possible to have a larger number of the compression stages to contribute to the total head of the compressor. As in the prior case, this gain in the total head is sufficiently large so as to over-compensate the loss of the geometric space which must be assigned and occupied by the second vector-adjusting stage with the concomitant relegation of the succeeding compression stages to the smaller respective radii.

It also should be mentioned here that while in FIG. 9 the flow turning angle $\epsilon_3$ is relatively small, the same angle $\epsilon_3$ in FIG. 12 is much larger because of the presence of the additional vector stage 1004. The larger is the angle of turning, the larger is the capacity of the stage to convert the mechanical energy. Therefore, in FIG. 10 through 12 the second compression stage of the compressor now will be able to convert a larger amount of mechanical energy into pressure than the same second stage in FIGS. 7–9. The same second stage 1003 in FIGS. 10–12 also will be able to pass along a larger amount of kinetic energy to the succeeding stages by making $\pm C_{u5}$ component in FIG. 12 larger than the $\mp C_{u3}$ component in FIG. 9.

FIG. 11 illustrates the sectional view of the blading of the stators and rotors in the compressor illustrated in FIG. 10. No detailed description of this figure appears necessary since, with the exception of the introduction of the additional vector-adjusting stage, this figure is similar to FIG. 8.

*Subsonic Compressor With One Vector-Adjusting Stage Positioned Between Two Co-Rotating Compression Stages: $\omega_1 \leqq \omega_2$*

Figure 14:
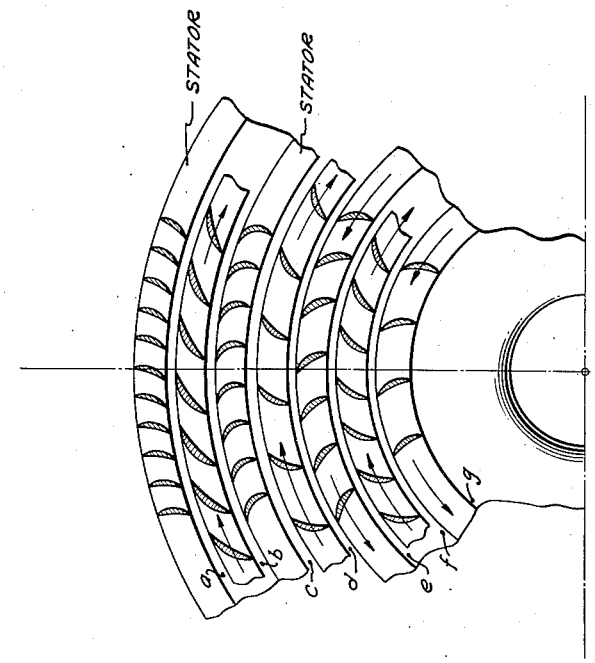
Figure 13:
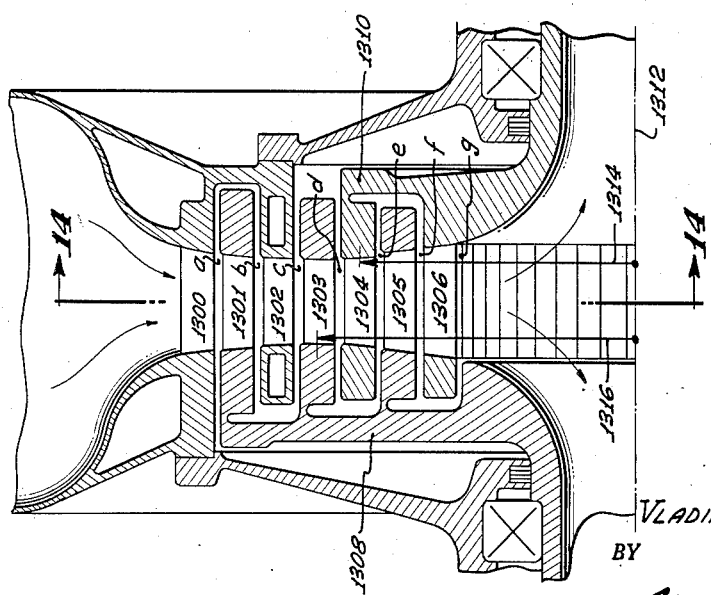

FIGS. 13–15 illustrate an additional version of the compressor in which the compressor stage succeeding the first vector-adjusting stage is a part of the first rotor.

Referring to FIG. 13, the order of the stages is as follows: a stationary contra-prerotation stage 1300; a first compression stage 1301; a vector-adjusting stage 1302; a second rotor compression stage 1303 co-rotating with the first stage 1301; and the remaining rotor compression stages are 1304, 1305 and 1306. The rotor compression stages 1301, 1303 and 1305 are all mounted on a disc 1308, this disc and the three compression stages constituting the first rotor. The second rotor includes a side disc 1310 and the two compression stages 1304 and 1306. In this case, the compression stage 1303 is followed by the succeeding compression stage 1304 which is a part of the second rotor. In FIGS. 7 and 8, the positions of the compression stages 1304 and 1305 of FIG. 13 are reversed. The advantage of the configuration illustrated in FIG. 13 resides in that it now is possible to obtain a higher peripheral velocity within the compressor at a small radial distance because the compression stage 1304 now has been placed closer to the axis of rotation 1312 making its mean radius 1314 smaller than the mean radius 1316 of the compression stage 1303. Accordingly, in this case, it is possible to have a constant local entry Mach number throughout the compressor, with the concomitant gain in the total head produced by the compressor.

FIGS. 14 and 15 illustrate the blading and the vector diagram, respectively, of this type of compressor. These figures are self-explanatory in the light of prior discussions.

*Subsonic Compressor With the First Vector-Adjusting Stage Positioned Between Two Co-Rotating Stages and the Second Vector-Adjusting Stage Positioned Between Two Contra-Rotating Compression Stages:* $\omega_1 < \omega_2$ FIGS. 16–18 disclose another modification of the centripetal compressor having a plurality of vector-adjusting stages. Accordingly, this modification is comparable to that disclosed in FIG. 10, in which two vector-adjusting stages 1000 and 1001 are used. In FIG. 16 two vector-adjusting stages 1602 and 1604 are used, both of which are supported by a compressor frame 1610 and the radially inner part of the compressor scroll 1612. Scroll 1612 in turn is supported by frame 1610. The difference between the compressor disclosed in FIG. 10 and that disclosed in FIG. 16 resides in the fact that the first vector-adjusting stage 1602 is positioned between the two co-rotating compression stages 1601 and 1603 while in FIG. 10 the first vector-adjusting stage is positioned between the two contra-rotating stages. The second vector-adjusting stage is positioned between the contra-rotating stages in FIG. 16 as well as in FIG. 10. Therefore, the outside diameter of the second rotor 1012 in FIG. 10 is larger than the outside diameter of the second rotor 1616 in FIG. 16.

Accordingly, in FIG. 16, the first stage of the second rotor follows the second vector-adjusting stage while, in FIG. 10, the first stage of the second rotor follows the first vector-adjusting stage. If the peripheral velocity of the third rotor compression stage 1605 is made equal to the peripheral velocity of the outer stage 1601, stage 1605 will be able to produce more kinetic energy of its own than the third rotor compression stage 1005 in FIG. 10, the position of which is comparable to the position of the rotor compression stage 1605 in FIG. 16. Stage 1605 will produce more kinetic energy than stage 1005 because of higher peripheral velocity although the mean radius 1618 of stage 1605 may be equal to the mean radius 1026 of the compression stage 1006.

In FIG. 16 it will be possible to have a constant local entry Mach number practically through all the rotor compression stages of the compressor, with the exception of the last stages 1609 and 1610. It is not feasible for the last stage 1610 to have the Mach number equal to the Mach number of the remaining stages because the peripheral velocity of the last stages may be too low.

The profile of the blading of the compressor, illustrated in FIG. 16, is illustrated in FIG. 17, which is self-explantory in light of the prior discussion.

It may be mentioned here, however, the first vector-adjusting stage 1602 now has blades 1700 which have a pronounced camber in the direction opposite to the direction of rotation 1702 of the succeeding compression stage. In this case, the vector-adjusting stage 1602 must have large camber blades because the compression stages 1601 and 1603 are mounted on the same rotor 1614 and therefore revolve in the same direction. Hence the difference between the degree of camber present in the blading 1700, as compared with the degree of camber present in the blading 1704 in the second vector-adjusting stage 1604.

The vector diagram for the compressor of FIG. 16 is illustrated in FIG. 18. The diagram follows the same principles as those outlined before, and therefore, needs no additional comment here.

Before concluding the description of FIGS. 16–18, it should be mentioned that it is possible to increase the number of vector-adjusting stages in the structures illustrated in FIG. 16 by fastening the additional vector-adjusting stages to a ring 1626 of stage 1604. This could be done in the manner illustrated in FIG. 10 by ring 1016 which inter-connects the stator rings 1020 and 1021. If the number of the vector-adjusting stages were to be increased in FIG. 16, the third vector-adjusting stage would be positioned between the compression stages 1605 and 1606. If still additional vector-adjusting stages would be contemplated, then this additional vector-adjusting stage would be positioned between the compression stages 1606 and 1607, etc.

*Subsonic Compressor With Two Vector-Adjusting Stages Positioned Between Co-Rotating Compression Stages:* $\omega_1 < \omega_2$ In FIG. 19, the first three compression stages 1901, 1903 and 1905 are mounted on the first rotor 1914 and the third compression stage follows the second vector-adjusting stage 1904. Accordingly, the outside diameter of the second rotor 1916 of the compressor is made smaller in FIG. 19 than the outside diameter of the second rotor in FIG. 16. Such arrangement is feasible, primarily for the compressors having at least medium-size outside diameters (40″–60″) which enables one to obtain sufficiently large peripheral velocities throughout the compressor, with the result that it becomes possible to obtain the constant entry Mach number by mounting the first three stages on the first rotor. The peripheral velocity of the fourth compression stage 1906 is then made equal to the peripheral velocity of the first compression stage 1901, which enables the innermost stages of the compressor to produce larger kinetic energies than it is possible to obtain with the compressor disclosed in FIG. 16. This compressor will produce greater total head than any other subsonic compressor disclosed in this specification.

Since the blading and the vector diagram for FIG. 19 would be comparable to those illustrated in FIGS. 17 and 18, the cross-sectional view of the blading and the vector diagram for FIG. 19 have been omitted altogether.

While the vector diagram for the type of compressor illustrated in FIG. 19 has been omitted, a very instructive curve is illustrated in FIG. 20 using $C_u$ components as abscissas and the radial positions of fluid within the compressor as ordinates. Accordingly, the positive and negative values of the peripheral velocity components $C_u$ at the exit and entry of all stages of the compressor have been plotted in FIG. 20 at right angles to the radius line 2000, which is the Y-axis in this figure. This radius line passes through the center of rotation 2002 and it also passes through the peripheral velocity components of fluid when they are equal to zero.

Therefore, the abscissa line 2004 passes through point 1920 in FIG. 19 and is perpendicular to the plane of the drawing; the ordinate line 2000 corresponds to line 1920—1928 in FIG. 19, and the point of intersection of the X—Y axes, which is point 2002 in FIG. 20, corresponds to point 1920 in FIG. 19. All values of $C_u$ to the right of the radial line, such as line 1800 in FIG. 18 are given a negative sign, and all values of $C_u$ to the left of line 1800 are given a positive sign for obtaining a reasonably accurate approximation of a $C_u$ curve.

Accordingly, the distance from point 2006 to point 2008 in FIG. 20 corresponds to the distance between points 1922 and 1924 in FIG. 19. In order to obtain a clearer presentation of the path traveled by the particle, the ordinate scale in FIG. 20 was made larger than the ordinate scale used in FIG. 19. The radial line 2000 in FIG. 20 corresponds to the radial line 1923 in FIG. 19, or any other radial line which is drawn through the axis of rotation 1930 and lies in any transverse plane which is perpendicular to the axis 1930 and which also passes through the compression stages 1901—1912 in FIG. 19.

Let us then imagine that this transverse plane passes through the radial line 1923 in FIG. 19 and that one actually is viewing, if it were possible, in the direction of an arrow 1931, the peripheral components of velocities $C_u$'s.

As illustrated in FIGS. 19 and 20, air then enters the compressor with a radial velocity $C_0$ which has no peripheral component and therefore this velocity will appear at point 2006 in FIG. 20. Air is then accelerated in the radial direction and it is also accelerated in the peripheral direction in the manner previously described in connection with the vectorial diagrams so that it leaves the stationary contra-prerotation stage 1900 with an absolute flow velocity $C_1$ which will have a radial component $C_{r_1}$ and a peripheral component $+C_{u_1}$ which are illustrated at the top of the vector diagram in FIG. 18. It is the $C_u$ peripheral component that is plotted in FIG. 20 for all stages of the compressor from stage to stage with the points a—b—c—d, etc., on the ordinate corresponding to the same points illustrated in FIG. 19, although this diagram does not illustrate the trajectory of the change of $C_u$ through the stages.

Accordingly, the air leaves the contra-prerotation stage 1900 with the peripheral velocity component $+C_{u_1}$ which in FIG. 20 is plotted as a positive value of $C_u$ because it is located in FIG. 18 to the left of the reference line 1800. These positive and negative values or signs may obviously be reversed either by reversing the direction of rotation of the compression stages, or by viewing the path of travel of the molecule not in the direction of the arrow 1931, but in the direction of the arrow 1932 (see FIG. 19).

After leaving the contra-prerotation stage 1900, the air travels through the gap between the contra-prerotation stage 1900 and the first compression stage 1901. It is assumed here that no appreciable change in the absolute velocity takes place as the air travels through the gap and therefore the peripheral component $+C_{u_1}$ at the exit from the contra-prerotation stage 1900 will be equal to the peripheral component $+C_{u_1}^1$ at the entry into the first compression stage 1901; the vertical spacing between $+C_{u_1}$ and $+C_{u_1}^1$ vectors in FIG. 20 corresponding to the dimension of the air gap between the first compression stage 1901 and stage 1900; the peripheral component will change its sign and will be increased to $-C_{u_2}$ at the exit from stage 1901.

The air then enters the vector-adjusting stage and leaves this vector-adjusting stage with a peripheral velocity $+C_{u_3}$.

The above process can be continued from stage to stage and if this is done, then the curve defined by the peripheral velocities will correspond to the curve illustrated in FIG. 20 with the air leaving the compressor at point 2008 with the absolute radial velocity $C_{12}$ which has no peripheral component.

From Equation 10 it follows that maximum heads per stage are obtainable when the amplitudes of the peripheral velocity components $C_u$ are as large as it is possible to make them without exceeding local entry Mach numbers in the subsonic version of the compressor. Examination of these amplitudes in FIG. 20 and their comparison with the same amplitudes that are obtainable in the classical compressor, which are illustrated in FIG. 21 and which are indicated in FIG. 20 by the radial lines 2010 and 2011, at once reveals the fact that such amplitudes in FIG. 20 are many times larger throughout the compressor than in FIG. 21 and therefore much larger total heads will be produced by the compressor illustrated in FIG. 19 than the total heads that can be obtained with the classical compressor. The amplitude gains are illustrated in FIG. 20 by the cross-hatched portions of the curve.

FIG. 21 represents the same curve as that illustrated in FIG. 20 but for a classical centripetal compressor having two contra-rotating rotors and a symmetrical vector diagram, such as that illustrated in FIG. 25. In this case, the maximum velocities $C_1$ and $W_1$ occur at the entry into the first compression stage, and all subsequent absolute as well as relative velocities diminish as the functions of the radial distances of the respective compression stages from the axis of rotation. Therefore, the maximum absolute value of $C_u$ occurs at the entry into the first stage, i.e., $+C_{u_1}$ is the maximum peripheral component in this case. All other components decrease progressively, as indicated by the radial lines 2100 and 2101 which correspond to the radial lines 2502 and 2503 in FIG. 25, and radial lines 2010 and 2011 in FIG. 20. Such progressive decrease in the $C_u$ components is due to a symmetry of the vectorial relationships in the classical compressor and adjustment of the turning angles of the stages and stage parameters so as to make the $C_u$ components decrease from stage to stage.

FIG. 22 is the peripheral velocity curve for a compressor having one vector-adjusting stage positioned between two contra-rotating compression stages, the compressor having nine compression stages. Accordingly, this sinuous curve is for the type of compressor illustrated in FIG. 7 but having nine compression stages rather than five illustrated in FIG. 7. The curve is asymmetric with respect to the radial reference line 2200 which is also the ordinate for locating the curve. The cross-hatched portions of the sinuous curve are those which project beyond lines 2201 and 2202, although this curve does not represent the trajectory of the changing $C_u$'s. Lines 2201 and 2202 correspond to the lines 2100 and 2101 in FIG. 21, and, therefore, the cross-hatched portions graphically indicate the gains in the magnitudes of the $C_u$ components that were obtained in the compressor, firstly, because of the introduction of the vector-adjusting stage, and, secondly, because of the asymmetric nature of the vector diagram which was produced by imparting to the fluid maximum amounts of kinetic energy in the outermost stages, and converting this kinetic energy into pressure in the intermediate and the innermost stages. The total gain in FIG. 22 is not as large as in FIG. 20, but it is very significant when compared with what would be the performance of this compressor if it were to be operated as a classical compressor, without any vector-adjusting stage, and with the vectorial relationships and stage parameters as those illustrated in FIG. 25 for the classical compressor.

FIG. 23 is identical in its construction and meaning as FIGS. 20 and 22. The sinuous graph is for a nine stage compressor with one vector-adjusting stage positioned between two co-rotating stages on the first compressor rotor. Therefore, this sinuous graph corresponds to that obtainable with the compressor illustrated in FIGS. 13 and 14 but with nine compression stages rather than five illustrated in FIGS. 13 and 14. The total gain obtained here in the amplitudes of $C_u$'s is greater than the gain obtained in FIG. 22.

FIGS. 20, 22 and 23, therefore, indicate that maximum gains in total head are obtained when the number of the vector-adjusting stages is increased to two and all of them are positioned between the co-rotating and not contra-rotating stages. This is due to the fact that high peripheral velocity can thus be obtained at a smaller mean radius, and therefore even the innermost stages are capable of producing high kinetic energies in the fluid.

FIG. 24 is a plot of the absolute values of the $C_u$ components (X axis) plotted against the radial distance through a centripetal compressor, point 2400 corresponding to a point located on the outer periphery of the first compression stage, and point 2401 corresponding to a point located on the inner periphery of the ninth or the last compression stage. This plot, illustrating the magnitudes of the $C_u$ components through the radial depth of the compressor, is for the compressor having nine compression stages and one vector-adjusting stage positioned between contra-rotating or co-rotating compression stages. Maximum amplitudes occur in the fourth and fifth stages and these maximum amplitudes, as to be expected from Equation 10, coincide with the maximum total heads per stage produced by these two stages. Constant entry Mach number is obtained in the first, second, third and fourth stages, and there is only a minor decrease in the Mach number in the fifth stage.

FIGS. 26 and 27 are curves of the mechanical heads for three compressors having the same outside diameter, the same number of stages and operating at the same Mach number at the entry into the first compression stage. The first compressor does not have any vector-adjusting stage, the second compressor has one vector-adjusting stage and the third compressor has two vector-adjusting stages. The first compressor utilizes a symmetrical vector diagram, such as that illustrated in FIG. 25 and, therefore, is the classical compressor. The second compressor is of the type disclosed in FIGS. 7–9 in which a single vector-adjusting stage is used between the outer-most stages of the two rotors. The two rotors of the second compressor have two equal but opposite angular velocities and, therefore, the peripheral velocity $U_1$ is larger than the peripheral velocity $U_3$. Accordingly, the second compressor does not represent the best or the highest mechanical head that can be obtained with the second compressor which is obtained when $U_1 = U_3$. The third compressor is of the type disclosed in FIGS. 10–12, with two vector-adjusting stages but with the two contra-rotating rotors having two equal angular velocities. Therefore, $\mp U_1 > \pm U_3$, as is the case in FIG. 10. Accordingly, the plotted mechanical heads for this third compressor again do not represent the best or the highest heads obtainable with the third type of compressor. Two equal angular velocities for the two rotors in each compressor were selected for making the operating conditions of all compressors identical for obtaining a more direct comparison between the three types of compressors. This comparison, therefore, is based upon the gain that can be obtained solely by making the vector diagrams asymmetrical.

In FIG. 26 the mechanical head in $$\frac{\text{foot-pounds}}{\text{pound}}$$

produced by each compression stage is plotted against the numerical designations of the compression stages for an eight stage compressor. The first compression stage is the outer stage of the first rotor, or the stage following the stationary contra-prerotation stage (stage 704 in FIG. 7; stage 1001 in FIG. 10, etc.) and the last stage is the innermost compression stage, which is the eighth compression stage.

Curve 2600 has a pronounced drooping characteristic with the heads decreasing from the first stage to the last stage; all heads are considerably lower for all stages than the heads for the corresponding stages on curves 2602 and 2604, the difference being especially marked for the third, fourth, and fifth stages between curve 2600 and curves 2602, 2604. Curve 2602 has a pronounced dip at point 2606 which is due to the fact that the kinetic energy of the fluid leaving the first stage and entering the second stage is so high that it cannot be converted into mechanical head by the second stage but must be passed along to the subsequent stages for converting it into pressure. In other words, this dip at 2606 in curve 2602 is a striking graphical indication that this compressor already needs an additional vector-adjusting stage which would allow the second stage to be more fully loaded. This is illustrated in curve 2604, for a compressor with two vector-adjusting stages in which case point 2606 at once rises to the level of point 2610.

All curves are for a local Mach number at the entry to the first compression stage equal to 0.684 which is a very low Mach number. If the Mach number at the entry to the first compression stage were to be increased to its possible maximum of .99, then the disparity between the curve 2600 and 2602—2604 would become even more pronounced because in the classical compressor it would be necessary to reduce the angular velocity of the second rotor to avoid exceeding the local Mach number at the entry into the second stage with the resulting loss of heads in all stages following the first stage. In the compressor with the vector-adjusting stages or stage it would be unnecessary to reduce the angular velocity of the second rotor and therefore both rotors would be contributing their full shares of the kinetic energies. Maximum heads are produced by the third and fourth stages on the curves 2602 and 2604 while in the classical compressor (curve 2600) the maximum head is produced by the first stage.

In FIG. 27, three curves 2700, 2702 and 2704 represent total mechanical heads produced by the three compressors described with reference to FIG. 26. The curves in FIG. 27, therefore, represent the sum total of the mechanical heads produced by the individual stages. Accordingly points 2706, 2708 and 2710 are the total mechanical heads appearing at the outputs of the respective compressors.

The total mechanical head of the compressor with a single vector-adjusting stage is approximately 48.5% greater than that obtainable with the classical compressor, and it is approximately 86% higher for the compressor with the two vector-adjusting stages. The above percentages would be much higher if $U_3$ were made equal to $U_1$ in the second and third compressors. Accordingly, what is illustrated in FIGS. 26 and 27 represents the most unfavorable comparison of the gains that can be obtained with the disclosed versions of the centripetal compressors when these versions are compared with the classical compressor. Prior discussion has indicated that maximum total heads are obtainable with the compressor disclosed in FIGS. 19 and 20 when $\mp U_1 = \pm U_7$, and $M_{w_1}$ and $M_{w_7}$ approach or are equal to .99. If the total head of the compressor in FIG. 19 were to be compared with the total head of the classical compressor in the manner indicated in FIG. 27, with $-U_1$ made equal to $+U_7$, then the gain in the total mechanical head would be much higher than 100%. This, obviously, is a good gain when such gain is obtained with the same number of compression stages. This gain can be increased still further by introducing an exit stator diffusion stage which would follow the last compression stage 1912 in FIG. 19 disclosed in S.N. 513,947.

The above gains and improvements in the performance characteristics of the centripetal subsonic compressors are obtained either without introducing any additional elements into the structure of the compressor (FIGS. 1–3) or by introducing structurally simple vector-adjusting stages. These vector-adjusting stages permit the use of much higher peripheral velocities for all rotors of the compressor no matter how many individual rotors there are in the compressor. This in turn permits compression of fluid at constant entry Mach number through a larger number of stages, and in some cases, through all the stages, including the very last, innermost stage of the compressor. With such operating conditions made possible by the vector-adjusting stages, the total heads produced by such centripetal compressors may be as much as 2 to 3 times as high as the maximum heads that can be obtained with the classical compressors having the same outside diameter and the same number of stages. What is equally important to observe is the fact that the above gains in the total heads are obtainable without resorting to any extraordinary efforts in terms of fluid dynamics and also in terms of the mechanical structures. The vectorial relationships, which determine the flow patterns and stage parameters are within the limits of classical flows and practicable cascade parameters, and therefore the disclosed compressors are not beset with such problems as flow separations, thickening of the boundary layers, cross-currents, and inability of the inner stages to utilize or accept the energies passed to them by the outer stages.

The design operating point for the described subsonic centripetal compressors may have the design Mach number in the order of 0.9. Regulating governors, if unable to cope with the sudden load fluctuations (an unlikely occurrence), may allow the compressor to reach a Mach number in excess of 0.9. In the disclosed compressors such exceeding of the local Mach number by the first stage will not produce an instantaneous "choking" and stalling effect throughout the compressor because of the difference in the solidity, camber and stagger angle in the compression stages. Therefore, the inner stages will work normally even if a "choking" condition is encountered in the first stage. This is not the case in an axial flow compressor where the parameters of the compression stages are practically identical and therefore "choking" or stoppage of flow or a decrease in flow takes place simultaneously in all stages.

*Three-Stage Supersonic Centripetal Compressor With a Vector-Adjusting Stage*

In discussing the overall performance characteristics of subsonic compressors, it has been stressed that total heads per stage and total head for the entire compressor are the highest if the local Mach numbers throughout the compressor remain substantially constant. It also has been stressed that difficulties arise in apportioning energies to the respective stages of the subsonic compressor when any one of these local Mach numbers exceeds the maximum value of .99, and that it becomes necessary to introduce vector-adjusting stages for avoiding such difficulties and still obtain substantially constant Mach numbers throughout the subsonic compressor.

The same basic considerations also apply to the supersonic centripetal compressors, although the fundamental reasons may differ. It may be stated in general that it would be desirable to maintain constant local Mach numbers throughout the supersonic compressor for obtaining maximum total heads, either per stage or for the entire compressor.

In the supersonic case, the basic considerations for the above reside in the fact that maximum total head per stage is obtained in a supersonic compressor when all three supersonic compression shocks are obtained within one single stage, these shocks being oblique, reflected and normal shocks. If, for example, oblique, reflected and normal shocks are produced in the first stage, at a local Mach number $M_{w_1}$, and, in spite of large reduction in the absolute flow velocity $C_1$ of the fluid, because of the presence of the above three shocks, there is still a possibility of having the local Mach number at the entry into the second stage, $M_{w_2}$ equal to $M_{w_1}$, then it will be possible to obtain all three shocks, oblique, reflected and normal shocks, in the second stage as well, with the concomitant large gain in the total head produced by the second stage. In such case, the total head produced in the first stage would be equal to the total head produced in the second stage. The above principle would be equally applicable to all succeeding stages of the supersonic compressor.

The methods and structures for obtaining compression of fluids, with the aid of the supersonic compression shocks are discussed more fully in the previously mentioned Patent Serial #2,804,747 and the divisional application S.N. 529,504, filed August 19, 1955, now U.S. Patent No. 2,949,224.

Therefore, the above applications are hereby incorporated by reference into this disclosure to the extent necessary for a complete understanding and for supplementing the divisional material which has been made a part of this disclosure. The divisional material which is being incorporated in this application relates to FIGS. 19, 20, 21–a, 21–b, of the parent patent which correspond to FIGS. 28, 29, 30A and 30B in this case.

Referring to FIG. 28, it discloses the longitudinal and axial cross-sectional view of the entire gas turbine power plant having a three-stage supersonic compressor, with one vector-adjusting stage and a three-stage turbine and a toroidal combustion chamber interposed between the turbine and the compressor. Since the power plant structure is claimed in the parent Patent 2,804,747, this description will be limited only to the three-stage supersonic compressor illustrated on the left side of FIG. 28. The compressor includes a stationary contra-prerotation stage 2800, the first compression stage 2801, the vector-adjusting stage 2802, the second compression stage 2803 and the third compression stage 2804. The first and the second compression stages 2801 and 2803 are mounted on the first rotor 2806 and the third compression stage is mounted on the second rotor 2808. The two rotors are rotated in the opposite directions by the two-rotor gas turbine generally designated by 2810.

The transverse vertical sectional view of the compression stages, taken in a plane perpendicular to the axis of rotation, said plane being indicated by line 29—29 in FIG. 28, is illustrated in FIG. 29.

Referring to FIG. 29, the stationary contra-prerotation stage 2900 has a plurality of blades 2901 which terminate in supersonic nozzles 2902. For a more detailed description of the shape of these blades, reference is being made to the parent case and especially FIG. 10 of the parent case. As indicated in FIG. 29, ambient air enters the contra-prerotation stage with an absolute flow velocity $C_0$ and leaves this stage with an absolute flow velocity $C_1$ which is a supersonic velocity. It then enters the first compression stage 2903 which has a plurality of blades 2904. These blades have wedge-shaped leading edges 2905 defined by a flat surface 2906 and a second flat surface 2907 which subtend angle $\alpha_1$. Surface 2907 is parallel to the relative velocity $W_1$ while surface 2906 is at an angle $\alpha_1$ to that velocity at the design point. The magnitude of this angle may have any value between 2° or 3° and up to 10°. This angle is discussed more fully in the divisional application S.N. 521,504 and therefore need not be described here.

The remaining surfaces of blade 2904 comprise a substantially circular surface 2908, a circular surface 2909 and a slightly convex surface 2910.

The leading edge 2905 encounters the air leaving the contra-prerotation stage at the supersonic relative velocity $W_1$ and since surface 2906 forms an angle $\alpha_1$ with the relative velocity $W_1$, this inclined surface of the blade produces an oblique supersonic shock 2911. If the velocity of the air upon its emergence from the oblique shock 2911 is sufficiently high and still supersonic, it will produce a reflected shock 2912. This will produce an additional reduction in the relative velocity. However, if the initial velocity is sufficiently high, then there is a possibility that an additional normal shock 2913 may follow the reflected shock 2912. As discussed more fully in the parent case, the combination of the oblique, reflected and normal shocks is difficult to achieve because in such case angle $\alpha_1$ would have to be quite small and, therefore, the wedge-shaped portion of the blades would have short useful life. Accordingly, the practical combination of the shocks would be as follows: oblique and normal, or oblique and reflected. Upon its emergence from the compression shocks, the compressed air follows the constant area portion of the flow channel of the first stage with the result that it leaves the first stage with an absolute velocity $C_2$ and a relative velocity $W_2$. Because of the constant area of this channel, it acts merely as a turning means for the air leaving the supersonic shocks. It is desirable to have a constant area channel in this instance in order to avoid any loss in the kinetic energy of the air upon its emergence from the shocks so that this high kinetic energy could be utilized in the subsequent stages where it would produce some supersonic compression shocks.

The next stage, which is 2914, is a stationary vector-adjusting stage which may be constructed as a purely turning stage, without diffusion, for adjusting only the angle of the absolute velocity $C_2$, or as a vector-adjusting stage which changes the direction of flow in the direction opposite to the direction of rotation of the next compression stage and also produces compression by means of an oblique shock. In the latter case, this vector-adjusting stage not only changes the direction of the absolute velocity $C_2$, but it also changes its magnitude to a lower velocity $C_3$. These changes in the direction and magnitude are also produced by the vector-adjusting stages in the subsonic compressors. The turning-and-compressing version of the vector-adjusting stage is more efficient than the direction-changing version and, therefore, is preferable to the mere turning stage. High efficiency is obtained with the turning-and-compression variation, because the compressed air travels at high velocity upon its emergence from the oblique shock and, therefore, this stage will have lower frictional losses than the turning stage. The compression-and-turning variation is illustrated at 2914 and the turning variation is illustrated at 2915.

The vector-adjusting stage 2914 differs from the compression stage 2903 in the configuration of the blades. In stage 2914 the flat surfaces 2906 have been omitted since no reflected shock is used in this stage.

Accordingly, the blade includes a flat surface 2915 parallel to the absolute velocity $C_4$ and two curved surfaces 2916 and 2917. The flat surface 2915 and the curved surface 2916 meet at the tip of the blade and form an angle $\sim \alpha_2$, the magnitude of which is selected to produce only an oblique shock. The magnitude of this angle is discussed in the parent case.

The compressed fluid leaves the first stage with an absolute flow-velocity $C_4$ and the relative velocity $W_2$, both of which are supersonic velocities. The absolute velocity $C_4$ is sufficiently high to produce an oblique shock 2918 in the vector-adjusting stage 2914. Upon the emergence from this oblique shock, the compressed air travels at a substantially constant velocity through the turning portion of this flow channel and it leaves this stage with a relative velocity $W_3$ and an absolute velocity $C_5$. It is desirable that the turning channel in stage 2914 is a constant flow velocity channel since introduction of any diffusion in this channel would only produce the thickening of the boundary layer and reduction in the velocity $C_5$, thus lowering the total head obtainable in the second rotatable compression stage 2919. This is so because greater compression ratio, or greater total head, would be obtainable in stage 2919 by maintaining $W_3$ as high as possible for obtaining strong oblique compression shock 2920. Therefore, any attempt of obtaining some compression by diffusion in the vector-adjusting stage 2914 would produce a disproportionate loss of compression in the second compression stage 2919.

Accordingly, the lower portion of the channel in the vector-adjusting stage 2914 will have no other effect on the compressed air, but to change the direction of its flow so that it leaves the stage in the direction indicated by the absolute velocity $C_5$. Therefore the lower portion of the vector-adjusting stage in the supersonic compressor performs the same function as the same portion performs in the subsonic compressor.

The vector diagram of the entire compressor is illustrated in FIG. 30A where the angle of flow turning obtained in stage 2914 is indicated by angle $\epsilon_2$.

Before concluding the description of FIG. 29, it may be mentioned here that although all flow channels in the compression stage 2903 and vector-adjusting stage 2914 and the second compression stage 2919 appear as diffusion channels in FIG. 29 because of their pronounced divergence in the radial or centripetal direction, this appearance is misleading and should be considered together with the appearance of these channels in FIG. 28, which illustrates that there is a constriction of the axial dimension of these channels as illustrated at 2812, 2814, 2816, 2817, 2818 and 2819. In view of the above, the lower portions of these channels are constant velocity channels.

Only an oblique shock 2920 is produced in the second compression stage 2919, because of relatively low relative velocity $W_3$. The compressed fluid then leaves stage 2919 with a relative velocity $W_4$. Since the compression stages 2903 and 2919 rotate in the same direction as illustrated by arrows 2922 and 2923, it follows that these two stages are mounted on the same rotor 2806 in the manner illustrated in FIG. 28, and therefore $U_1$ is greater than $U_3$, which is an additional reason why a single oblique shock 2920 is produced in the second compression stage 2919. The blades 2924 of this stage are comparable to blades 2925 used in the vector-adjusting stage since only an oblique shock is obtained in the second compression stage.

The last stage of the compressor, which is stage 2926, has blades 2927. Their leading portions are constructed in the same manner as the leading portions of the blades 2924 and 2925. These blades are defined by a concave surface 2929, a convex surface 2930 and a flat surface 2928; the concave surface 2929 and the flat surface 2928 subtending an angle $\alpha_3$. The oblique shock is made possible in this third stage because the absolute magnitude of its peripheral velocity $U_5$ is made equal to the peripheral velocity $U_1$ of the first stage. The remaining portion of the flow channel is a diffusion channel which discharges the compressed air with a relative velocity $W_6$ and an absolute velocity $C_8$. Velocity $C_8$ may be radial in its direction if no swirl is desired at this point. The diffusion channel in the last stage 2926 can be arranged so that the absolute velocity $C_8$ or relative velocity $W_6$ is radial. When the combustion chamber revolves with the last compression stage 2926 in the manner illustrated in FIG. 28, then it is the relative velocity $W_6$ which should be radial rather than the absolute velocity $C_8$.

FIG. 29 also illustrates another version of the vector-adjusting stage. In this version, the vector-adjusting stage is a purely turning stage. Since the absolute velocity $C_4$ is a supersonic velocity, the only way to achieve this turning is by means of Prandtl-Meyer turning, which is illustrated in the figure by stage 2915. One side of the blade has a purely cylindrical surface 2933, while the other surface is polygonal having either two or three angles of turning. Three angles, 2934, 2935 and 2936 are illustrated in the figure, which are equal to each other and evenly distributed around the periphery of the blade. Therefore, each angle is equal to the total angle of turning $\theta_2$ illustrated in FIG. 30B divided by three.

Surface 2937 is parallel to the entry velocity $C_4$; surface 2938 is parallel to the exit velocity $C_5$; and the cylindrical surface 2933 is tangent to these surfaces at the outer and inner peripheries of the stage, which closes the parameter of the entire figure.

From the above it follows that the leading and the trailing edges of this version of the vector-adjusting stage should, in theory at least, have zero radii. This ideal form need not be followed in toto at the trailing edge since a certain amount of turbulence may be tolerated at the exit. However, any marked departure from the ideal at the leading edge will produce an oblique shock which will interfere with the Prandtl-Meyer turning of the fluid by creating a compression wave; this compression wave in turn will introduce a pressure rise at the entry into the flow channel which cannot be taken into consideration in this type of channel. Since it is impossible to have an ideal type of leading edge, it is best to have the type of blade construction used in the vector-adjusting stage 2914, i.e., blades 2925. Accordingly, the practicable way of introducing the vector-adjusting stage into a supersonic compressor would be by introducing a stage which will produce an oblique shock of its own in response to the supersonic absolute velocity $C_4$ at the entry into this stage.

The velocity vector diagram for the three-stage supersonic centripetal compressor, with the single vector-adjusting stage is illustrated in FIG. 30A and 30B, FIG. 30A being for the compressor using stage 2914, while FIG. 30B is for the same compressor having the Prandtl-Meyer turning stage 2915.

In FIG. 30A the air enters the pre-rotation stage at a radial velocity $C_0$ and leaves it at a supersonic velocity $C_1$; it enters the first compression stage 2902 with an absolute velocity $C_2$ and relative velocity $W_1$, both of which are supersonic. Air leaves the first compression stage at a relative supersonic velocity $W_2$, but enters the vector-adjusting stage 2914 at a supersonic absolute velocity $C_4$ which is substantially equal to the absolute exit velocity $C_3$ from the first stage. Air leaves stage 2914 at a subsonic velocity $C_5$, but due to the rotation of the second stage with the peripheral velocity $U_3$, the relative entry velocity $W_3$ into the second stage is supersonic. The absolute exit velocity $C_6$ from the second stage is subsonic, but due to the rotation of the third stage with a high peripheral velocity $U_5$, which is equal to $U_1$; the air eners the third stage at a supersonic relative velocity $W_5$. The remaining velocities $W_6$ and $C_8$ are subsonic.

It is not believed necessary to give a detailed description of the vector diagram illustrated in FIG. 30B, because the latter is self-explanatory in the light of the description given for FIG. 30A. The Prandtl-Meyer turning in the vector-adjusting stage 2915 is illustrated by an angle $\epsilon$, which is the angle between the absolute velocities $C_4$ and $C_5$.

In FIG. 30A the peripheral component of the absoltue velocity $C_5$ is shown as being smaller than the peripheral component of the absolute entry velocity $C_4$. This need not necessarily be the case in all applications of this diagram; for example, angle $\alpha_4$ may be increased and angle $\alpha_5$ may be decreased to make the peripheral component of the absolute velocity $C_5$ larger than the peripheral component of the absolute velocity $C_4$, with velocity $C_5$ remaining smaller than velocity $C_4$. Such increase in the peripheral component of the absolute velocity $C_5$ would result in a larger relative velocity $W_3$ than the vector of the velocity $W_2$, so that velocity $W_3$ might be made larger than velocity $W_1$, with the result that Mach number $M_{W_1}$ could be made equal to Mach number $M_{W_3}$.

Accordingly, the supersonic variation of the compressor with the vector-adjusting stage 2914 corresponds to the subsonic version illustrated in FIG. 13 where the vector-adjusting stage is positioned between two co-rotating compression stages.

As in the case of the subsonic compressor, the compression ratio of the supersonic compressor is increased by making $U_5$ equal to $U_1$.

Additional similarity between the subsonic and supersonic versions of the compressor resides in the fact that only a limited amount of gain in the static head is obtained in the vector-adjusting stages, and, therefore, the primary function of the vector-adjusting stage in both cases, subsonic and supersonic, is for obtaining proper angle adjustment of the vectors, rather than for obtaining any marked static head or compression in the vector-adjusting stage. The gain is obtained in both cases by obtaining complete freedom of operation for all stages at high peripheral velocities and high local Mach numbers in all stages of the compressors with the result that it becomes possible to assign optimum operating stage parameters to all stages of subsonic or supersonic compressors. When the supersonic compressor has more than three compression stages, such as in FIGS. 7, 8, 10, etc., then the first stages are supersonic and the remaining stages are subsonic. In such case the compressor becomes supersonic-subsonic.

Before concluding the description of this invention it may be fitting to point out more precisely the advantages which are obtained by operating the disclosed compressors as contra-rotating compressors having two rotors, with one rotor rotating in one direction and the second rotor rotating in the opposite direction, as compared to a compressor having a single rotor and a plurality of turning stages between the compression stages of the single rotor. The advantages obtained with contra-rotation were pointed out previously in Patent #2,712,895. However, in the above patent no mathematical derivations were finished for demonstrating the actual gains obtained when the contra-rotating compressor is compared wtih the single rotor, or single rotation compressor. Such mathematical comparison is furnished below.

Before proceeding, however, with such mathematical comparison, it will be necessary to establish, or fix, some relationships, as they apply to both cases, and make some stipulations for both cases, in order to make the comparison at all possible. One cannot compare the single rotation and the contra-rotating compressors in general terms since there would be so many variables that no comparison would be possible. The most direct manner of comparison is to compare both types of compressors on the basis of fixed velocity triangles, fixed angles and the same peripheral velocities. Moreover, one must compare what is accomplished by a single compression stage and a single stator, or turning stage, in a single rotation compressor with what is accomplished with two contra-rotating stages of the contra-rotating machine because the single rotation machine always needs two rows of blades for accomplishing one step of compression. Therefore, the comparison should also include two rows of blades in the contra-rotating compressor, which means two contra-rotating compression stages.

FIG. 31 illustrates the relationship of vectors for the two compressors, where the notations are the same as those used in the earlier figures, except that the subscript "s" is used for denoting single rotation vectors and subscript "c" is used for denoting the contra-rotation vectors.

For a single-rotating compressor, the total head produced by the first stage (with velocities as vectors) is:

$$-\Delta L = -\frac{1}{g}(C_{u_2}U_2 - C_{u_1}U_1) \qquad (19)$$

where the notation is the same as explained previously in this specification.

It may be assumed here without introducing any great error that $$U_1 = U_2 = U \qquad (20)$$

Accordingly, for a single-rotating compressor, Equation 19 may be written as follows (using terminology of Equation 1 but with "s" to designate single rotation):

$$-\Delta L_1 = -\frac{1}{g}(U)(C_{u_2}{}^s - C_{u_1}{}^s) \qquad (21)$$

Equation 21 for a contra-rotating compressor is (from 19, with all velocities as vectors):

$$-\Delta L_1 = -\Delta L_2 = -\frac{1}{g}(U)[C_{u_1}{}^c - (-C_{u_2}{}^c)] \qquad (22)$$

using the same cascade as for Equation 21 and the same peripheral velocity U, as shown in FIG. 31.

From the geometry of the velocity vector diagram, the following scalar relations exist for the contra-rotating compressor:

$$C_{u_1}^c + C_{u_2}^c = U_2 = U \quad (23)$$

and therefore $$C_{u_2}^c = U - C_{u_1}^c \quad (24)$$

Similarly, for the single-rotating compressor $$C_{u_2}^s = U - C_{u_1}^s \quad (25)$$

and from the symmetry of the vector diagram, $$C_{u_2}^c = C_{u_1}^c = C_u^c \quad (26)$$

$$C_{u_2}^s = 3C_{u_1}^s \quad (27)$$

and $$C_u^c = 2C_{u_1}^s \quad (28)$$

Substituting (27) into (21), $$-\Delta L_1 = -\frac{1}{g}(U)(3C_{u_1}^s - C_{u_1}^s) = -\frac{1}{g}(U)(2C_{u_1}^s) \quad (29)$$

and (26) and (28) into (22), $$-\Delta L_2 = -\frac{1}{g}(U)(C_{u_2}^c + C_{u_1}^c) \quad (30)$$

$$-\Delta L_2 = -\frac{1}{g}(U)(2C_{u_1}^c) \quad (31)$$

$$-\Delta L_2 = -\frac{1}{g}(U)(4C_{u_1}^s) \quad (32)$$

The Equation 31 expresses the total pressure head of only one rotor of a contra-rotating stage system, while Equation 29 expresses the total pressure head produced in one rotor and one stator of a single rotation compressor. In the single rotation machines, it is obviously necessary to have a stator stage to follow each rotatable compression stage, these stator stages being the well-known turning-and-diffusion stages. Therefore, in single rotation compressors, one rotatable compression stage and one stator turning stage constitute a single working combination. Normally, there are no stators in the contra-rotating machines, the vector adjusting stators disclosed in this specification being the exception. This being the case, it is only fair in comparing the single rotation compressor with the contra-rotating compressor, to compare the rotor-stator unit of the single rotation machine with two contra-rotating stages of the double rotation machine since the single contra-rotating stage is equivalent to the stator in the single rotation machine in terms of actual cost and space it occupies in the compressor.

Therefore, for comparison with equal number of blade rows in both cases, it is necessary to multiply Equation 32 by two. The contra-rotating compressor will, therefore, produce $$\frac{-2\Delta L_2}{-\Delta L_1} = \frac{-(2/g)(U)(-4C_{u_1}^s)}{-(1/g)(U)(-2C_{u_1}^s)} = 4 \quad (33)$$

or four times greater pressure head at the same absolute velocity of rotation and in the same number of blade rows as the single rotating compressor, the cascades of the blade rows being otherwise identical in all respects.

Since the through-flow velocity of a comparative contra-rotating compressor is twice as large as the trough-flow velocity of a single-rotating machine, as is also shown in the velocity diagram, FIG. 31, it follows that the power output of a contra-rotating turbomachine, running at the same peripheral velocity as a single-rotating machine, is eight times greater than of the single-rotating machine.

In reality, this comparative case, $U_c = U_s$ is difficult to realize because the relative velocity of rotation, or contra-rotation, would be twice as high as the absolute velocity (peripheral), and the velocity diagram, FIG. 31, would result in velocities having high Mach numbers, the relative inflow velocities being highly supersonic.

But it is possible to make contra-rotating machines of equal Mach number to the single-rotating machines; such machines will produce large energy conversions per each set of two blade rows, larger than can be accomplished in a single-rotating machine in comparable two rows of blades. The invention described in the preceding text is a very effective way of doing this, at lower-than-equivalent absolute speds of rotation necessary with single-rotating machines, or in fewer blade rows at the same peripheral speed.

Any number of combinations may be imagined. For instance, a single-rotating compressor, if rotated in contra-rotation, would have to turn each rotor at only one-half of the single-rotating peripheral speed of rotation and still produce full flow and full pressure as in single rotation.

In claiming the disclosed methods of compressing fluid, reference is made in the claims to such quantities as local entry Mach number, kinetic energy of gases, static pressure head produced by compression stages, absolute exit velocities, etc. It is stated, for example, in some of the claims that if the entry Mach numbers of the first and second stages are $M_{w_x}$ and $M_{w_y}$, then the relationship between them is as follows:

$$M_{w_y} = M_{w_x} + \Delta M_{w_y}$$

where $\Delta M_{w_y}$, at the design point of compressor, may have any value between the following limits:

$$\Delta M_{w_y} = -0.1$$

$$\Delta M_{w_y} = +0.1$$

including the value of $$\Delta M_{w_y} = 0$$

It should be obvious, in the light of the information given in the specification, that the above limits represent very narrow optimum limits which were selected to represent the optimum operating conditions obtainable with the disclosed compressor. These limits could have been made much larger. For example, $\Delta M_{w_y}$ may be made $-0.5$ or $+0.5$. However, it is equally obvious that if $\Delta M_{w_y}$ is made equal to $-0.5$, the Mach number at the entry into the second stage will be excessively and needlessly low with the concomitant loss in the compression ratio of the first stage. The same is true of the first stage when $\Delta M_{w_y}$ is made equal to $+0.5$. The Mach number of the first stage will be needlessly low as compared to the Mach number of the second stage, and, again, the performance of the compressor will suffer.

It should be understood, therefore, that the claims of the above type state only the optimum operating conditions and the spirit of the invention is not predicated on the difference between, for example, $+0.1$ or $-0.1$ on one hand, and, say $+0.3$ or $-0.3$. The latter figures do not reflect the very best that can be derived with the disclosed method but they do not indicate that the methods will be rendered inoperative. The same conditions also apply to the kinetic energies, the static pressure heads, and the absolute velocities, which are directly related to the Mach numbers.

An additional explanation is necessary insofar as the claims are concerned: The specification treats the velocities as vectors, having positive and negative signs, especially when any equations are concerned. In the claims, the velocities are treated as scalar quantities since the use of positive and negative signs would have no particular significance and would only confuse the reader. For example, when a claim states that $U_n$ is equal to $U_1$, it means that the scalar magnitudes are equal. It is to be noted that vectorially $U_n$ may have either a positive or negative sign and this is also true of $U_1$.

What I claim is:

1. The method of compressing a fluid with a centripetal compressor having a plurality of contra-rotatable compression stages, including a first, or the outermost, rotatable compression stage and an additional contra-rotatable compression stages N following said first stage, said method including the steps receiving said fluid with a relative entry velocity $W_1$ having a relative local entry Mach number $M_{w_1}$ at the entry into said first stage, converting into a kinetic energy of said fluid a portion of the mechanical energy input supplied to said first stage; and transmitting said fluid and a portion of said kinetic energy to said additional contra-rotatable stage N with a relative entry velocity $W_n$ at the entry, into said additional stage N, and a local relative entry Mach number $M_{w_n}$, said Mach number $M_{w_n}$ having the following range of magnitudes:

$$M_{w_n}=M_{w_1}\pm\Delta M_{w_n}$$

where $\Delta M_{w_n}$ may have any value from $-0.5$ to $+0.2$.

2. The method of compressing a fluid with a centripetal compressor having at least first and second sets of compression stages, said method including the steps of rotating said first set in one direction and said second set in the opposite direction at two outer peripheral velocities $U_1$ and $U_n$, respectively, for producing mechanical energy inputs for each stage, generating within each stage static and kinetic energy components within said fluid as said fluid passes through said stages, said static and kinetic energy components representing the respective energy conversions of the respective mechanical energy inputs for each stage, apportioning the conversion of said mechanical energy inputs into the static and kinetic components in the respective outer stages and imparting the respective directions to the respective kinetic energy components at the exit of said fluid from said outer stages; to produce constant local entry Mach numbers operation in said outer stages, and transmitting the remaining portions of kinetic energy components to the inner stages for converting said last kinetic energy components into static energy components within said inner stages for contributing to the total static pressure generated by said compressor.

3. The method as defined in claim 2 which includes the additional step of making the absolute value of said $U_n$ equal to the absolute value of said $U_1$.

4. In a centripetal compressor including at least one compression stage and an additional compression stage having a smaller mean radius than the mean radius of said one stage, said stages being rotatable in opposite directions, the method of compressing a fluid in a centripetal direction by means of said compressor, said method including the steps of rotating said one stage, imparting a kinetic energy $\Delta K_1$ to said fluid during the passage of said fluid through said one stage, rotating said additional stage in the direction opposite to the direction of rotation of said one stage, and imparting a kinetic energy $\Delta K_2$ to said fluid during the passage of said fluid through said additional stage, said $\Delta K_2$ having the following range of relationships with respect to $\Delta K_1$:

$$\Delta K_1 = \Delta K_2$$
$$\Delta K_1 < \Delta K_2$$

5. In a centripetal compressor including at least one compression stage and an additional compression stage having a smaller mean radius than the mean radius of said one stage, the method of compressing a fluid in a centripetal direction by means of said compressor, said method including; the steps rotating said one stage in one direction, admitting said fluid into said one stage at an absolute entry velocity $C_1$ and discharging said fluid from said one stage with an absolute exit velocity $C_2$, rotating said additional stage in the direction opposite to the direction of rotation of said one stage, admitting said fluid into said additional stage at an absolute entry velocity $C_n$, and discharging said fluid from said additional stage with an absolute exit velocity $C_{n+1}$, the relationship between the absolute magnitudes of said absolute velocities including the following limits:

$$C_1 < C_2$$
$$C_2 \equiv C_n$$
$$C_n \leq C_{n+1}$$

6. In a centripetal compressor including at least one compression stage and an additional compression stage having a smaller mean radius than the mean radius of said one stage, the method of compressing a fluid in a centripetal direction, said method including the steps of rotating said one stage in one direction with a mean peripheral velocity $U_x$, compressing said fluid in said one stage at a local entry Mach number $M_{w_x}$, rotating said additional stage in the direction opposite to the direction of rotation of said one stage and with a mean peripheral velocity $U_y$, and compressing said fluid in said additional stage at a local entry Mach number $M_{w_y}$, said $M_{w_y}$ being equal to:

$$M_{w_y}=M_{w_x}+\Delta M_{w_y}$$

where $\Delta M_{w_y}$, at the design point of said compressor, may have any value between the following limits:

$$\Delta M_{w_y}=-0.5$$
$$\Delta M_{w_y}=+0.2$$

including the value of $\Delta M_{w_y}=0$.

7. The method as defined in claim 6 which includes the additional step of making the absolute value of said $U_y$ equal to the absolute value of said $U_x$.

8. In a centripetal compressor including at least one compression stage and an additional compression stage having a smaller mean radius than the means radius of said one stage, the method of compressing a fluid in a centripetal direction, said method including the steps of rotating said one stage in one direction, compressing said fluid in said one stage at a local entry Mach number $M_{w_x}$, rotating said additional stage in the direction opposite to the direction of rotation of said one stage and compressing said fluid in said additional stage at a local entry Mach number $M_{w_y}$, where Y is the number of said additional stage, said $M_{w_y}$ being equal to:

$$M_{w_y}=M_{w_x}+\Delta M$$

where $\Delta M$ may have any value between the following limits:

$$\Delta M = 0.5$$
$$\Delta M = +0.2$$

at the design operating point of said compressor.

9. In a centripetal compressor including at least one compression stage and an additional compression stage having a smaller mean radius than the mean radius of said one stage, the method of compressing a fluid in a centripetal direction, said method including the steps of rotating said one stage in one direction with a peripheral velocity $U_x$, admitting said fluid into said one stage at a relative velocity $W_x$, generating a static pressure head $\Delta H_x$ at the exit from said one stage whose magnitude is directly proportional to the peripheral component $W_{u_x}$ of said relative velocity $W_x$; rotating said additional stage, in the direction opposite to the direction of rotation of said one stage, with a peripheral velocity $U_y$, admitting said fluid into said additional stage at a relative velocity $W_y$, and generating a static pressure head $\Delta H_y$ at the exit from said additional stage whose magnitude is directly proportional to the peripheral component $W_{u_y}$ of said relative velocity $W_y$; said $\Delta H_y$ having the following range of limits with respect to $\Delta H_x$:

$$\Delta H_y = \Delta H_x$$
$$\Delta H_y > \Delta H_x$$

10. In a centripetal compressor having a plurality of contra-rotatable compression stages having a first compression stage as the outermost stage and the last stage as the innermost stage and a plurality of intermediate stage between said first and last stages, said intermediate stages having a first set of stages and a second set of stages, said first set following said first stage, and said second set following the innermost stage of the first set, the method of compressing a compressible fluid in a centripetal direction, said method including the steps of discharging said fluid from said first stage with an absolute exit velocity $C_2$ having a peripheral velocity component $C_{u_2}$, discharging said fluid from the successive stages of the first set with respective absolute exit velocities having successively increasing peripheral components which are greater than $C_{u_2}$, the maximum peripheral velocity component $C_{u_{max}}$ of said fluid being at the exit of said fluid from the innermost stage of said first set, and discharging said fluid from the successive stages of the second set with respective absolute exit velocities having peripheral velocity components decreasing from $C_{u_{max}}$ to $C_{u_n}$.

11. The method of compressing a fluid by means of a centripetal compressor having a rotatable compression stage X, a stationary vector-adjusting stage V receiving a compressed fluid from said stage X and then discharging it into a rotatable compression stage Y, said method including the steps of rotating the outer periphery of said stage X at a peripheral velocity having an absolute value $U_x$, discharging said fluid from said stage X and into said stage V with an absolute exit velocity $C_x$ having a peripheral exit velocity component of absolute value $C_{u_x}$, and a relative exit velocity component $W_{u_x}$, said $C_{u_x} > W_{u_x}$, passing said fluid through said stage V for reducing the absolute magnitude of $C_x$ to an absolute exit velocity $C_v$ upon the exit of said fluid from said stage V, and also for making the absolute value of the peripheral velocity component $C_{u_v}$ of said $C_v$ smaller in magnitude than the absolute magnitude of said $C_{u_x}$; and rotating the outer periphery of said stage Y at a peripheral velocity having an absolute value $U_y$, for making said fluid enter said stage Y at a relative velocity $W_y$.

12. The method as defined in claim 11 which includes the additional step of reducing said peripheral component $C_{u_v}$ to a value to make the magnitude of the local entry Mach number $M_{w_y}$ at the entry into stage Y have the following limits with respect to the magnitude of the local entry Mach number $M_{w_x}$ at the entry into stage X:

$$M_{w_y} = M_{w_x} + 0.2$$
$$M_{w_y} = M_{w_x} - 0.5$$

13. The method as defined in claim 11 which includes the additional step of rotating said stage Y so that the limits of the absolute values of said $U_y$, when compared with the absolute value of $U_x$, are as follows:

$$U_y = U_x \text{ (maximum)}$$

$$U_y = \left(\frac{r_y}{r_x}\right) \cdot U_x \text{ (minimum)}$$

where:

$r_y$ is the mean radius of stage Y, and
$r_x$ is the mean radius of stage X.

14. In a centripetal compressor having a stationary contra-prerotation stage and a first compression stage following said contra-prerotation stage, the method of compressing a fluid in a centripetal direction, said method including the steps of discharging said fluid from said stationary contra-prerotation stage and receiving said fluid at the entry into said first compression stage with an absolute flow velocity $C_1$, rotating the outer periphery of said first compression stage with a peripheral velocity $U_1$, and the inner periphery with a peripheral velocity $U_2$ for making said fluid to enter said first compression stage at a relative flow velocity $W_1$ and to leave said compression stage with an absolute flow velocity $C_2$ and a relative flow velocity $W_2$, the velocity relationships in said compression stage being as follows:

$$C_2 > C_1$$
$$W_1 > W_2$$

15. The method as defined in claim 14 which also includes the additional step of changing the direction of flow of said fluid within said first compression stage through an angle of turning $\epsilon_1$, said angle being an angle subtended by the relative flow velocities $W_1$ and $W_2$, the optimum value of said angle of turning being of the order of 30°.

16. The method as defined in claim 14 which also includes the additional step of changing the direction of flow of said fluid from the direction defined by the relative flow velocity $W_1$ at the entry into said compression stage to the direction defined by the relative flow velocity $W_2$ at the exit from said compression stage, the change the direction of flow being defined by an angle of turning subtended by $W_1$ and $W_2$, and assigning said angle a value to make a local entry Mach number $M_{w_3}$, at the entry into the next, succeeding compression stage have the following limits:

$$M_{w_3} = M_{w_1} - 0.5$$
$$M_{w_3} = M_{w_1} + 0.2$$

where $M_{w_1}$ is the local entry Mach number at the entry into said first stage.

17. The method as defined in claim 14 which also includes the additional step of changing the direction of flow of said fluid from the direction defined by said absolute flow velocity $C_1$, said velocity $C_1$ vector subtending an approach angle $\alpha_1$ with a radial line passing through the axis of rotation of said compressor and through the point of origin of said velocity vector $C_1$, to the direction defined by said absolute flow velocity $C_2$, said velocity $C_2$ vector subtending an exit angle $\alpha_2$ with a radial line passing through the axis of rotation of said compressor and through the point of origin of said velocity vector $C_2$, the relationship between $\alpha_1$ and $\alpha_2$ being as follows:

$$\alpha_1 < \alpha_2$$

18. In a centripetal compressor having first and second rotors, the method of compressing a fluid within said compressor along a centripetally directed path lying in a plane perpendicular to the axis of rotation of said compressor, said path having a radially directed reference line passing through said axis, said method including the steps of rotating said first rotor in one direction and said second rotor in the opposite direction, and forcing said fluid through said stages, whereby said fluid follows a centripetally directed sinuous path, said sinuous path having positive and negative amplitudes with respect to said line, the positive amplitudes being on one side of said line and the negative amplitudes being on the other side of said line, said sinuous path being asymmetric with respect to said line on both sides of said line and having a maximum amplitude anywhere between the origin and the mid-portion of said path.

References Cited in the file of this patent

UNITED STATES PATENTS

| | | |
|---|---|---|
| 2,471,892 | Price | May 31, 1949 |
| 2,853,227 | Beardsley | Sept. 23, 1958 |
| 2,935,246 | Roy | May 3, 1960 |

FOREIGN PATENTS

| | | |
|---|---|---|
| 459,043 | Italy | Aug. 23, 1950 |
| 813,337 | France | Feb. 22, 1937 |